(12) United States Patent
Lanigan et al.

(10) Patent No.: US 11,668,408 B2
(45) Date of Patent: Jun. 6, 2023

(54) VALVE APPARATUS AND SYSTEM

(71) Applicant: DEKA Products Limited Partnership, Manchester, NH (US)

(72) Inventors: Richard J. Lanigan, Concord, NH (US); David Blumberg, Jr., Deerfield, NH (US); Timothy D. Moreau, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 6 days.

(21) Appl. No.: 17/240,311

(22) Filed: Apr. 26, 2021

(65) Prior Publication Data

US 2021/0246994 A1    Aug. 12, 2021

Related U.S. Application Data

(63) Continuation of application No. 14/327,206, filed on Jul. 9, 2014, now abandoned.

(Continued)

(51) Int. Cl.
*F16K 31/06* (2006.01)
*F16K 31/08* (2006.01)
*F16K 31/00* (2006.01)

(52) U.S. Cl.
CPC ........ *F16K 31/0679* (2013.01); *F16K 31/003* (2013.01); *F16K 31/0606* (2013.01); *F16K 31/0627* (2013.01); *F16K 31/082* (2013.01)

(58) Field of Classification Search
CPC .. F16K 31/0679; F16K 31/003; F16K 31/082; F16K 31/0627; F16K 31/0606;

(Continued)

(56) References Cited

U.S. PATENT DOCUMENTS

| 2,875,780 | A | ‡ | 3/1959 | Martin | ................ | F16K 31/0606 |
| | | | | | | 137/315.03 |
| 2,983,285 | A | ‡ | 5/1961 | Gardner | .............. | F16K 31/0613 |
| | | | | | | 137/625.65 |

(Continued)

FOREIGN PATENT DOCUMENTS

| CA | 2324255 | | 9/1999 | | |
| CA | 2324255 | A1 ‡ | 9/1999 | ............. | B60R 21/26 |

(Continued)

OTHER PUBLICATIONS

International Search Report and Written Opinion dated Oct. 15, 2014, issued in PCT Patent Application No. PCT/US2014/046006, 10 pages.

(Continued)

*Primary Examiner* — Mary E McManmon
*Assistant Examiner* — Nicole Gardner
(74) *Attorney, Agent, or Firm* — Mark E. Tetreault

(57) ABSTRACT

A bistable valve. The valve includes an interior cavity; a first pressure source; a second pressure source; a first post connected to the interior cavity at a first end of the interior cavity; a second post connected to the interior cavity at a second end of the interior cavity; a magnetic shuttle located within the interior cavity; a first electromagnetic coil disposed about the first post; a second electromagnetic coil disposed about the second post; wherein when the first electromagnetic coil is energized, the first electromagnetic coil supplies a magnetic charge to the first post and actuates the magnetic shuttle to move towards the first end of the interior cavity towards the first post and seal the first pressure source.

6 Claims, 38 Drawing Sheets

Related U.S. Application Data

(60) Provisional application No. 61/844,202, filed on Jul. 9, 2013.

(58) Field of Classification Search
CPC ........... F16K 11/044; Y10T 137/86831; Y10T 137/86815; Y10T 137/87684; Y10T 137/87692
See application file for complete search history.

(56) References Cited

U.S. PATENT DOCUMENTS

| | | | | |
|---|---|---|---|---|
| 3,141,115 | A ‡ | 7/1964 | Lansky | ............... F16K 31/0679 251/30.02 |
| 3,809,123 | A ‡ | 5/1974 | Heimann | ............... F16K 31/082 137/625.5 |
| 4,253,493 | A | 3/1981 | English | |
| 5,144,982 | A * | 9/1992 | Willbanks | ............. H01F 7/1646 137/625.5 |
| 6,158,713 | A ‡ | 12/2000 | Ohya | .................. F16K 31/0679 137/870 |
| 6,664,883 | B2 ‡ | 12/2003 | Patel | ................... H01F 27/2804 29/602.1 |
| 7,455,075 | B2 * | 11/2008 | Xu | ...................... F16K 31/0627 251/30.01 |

FOREIGN PATENT DOCUMENTS

| | | | | |
|---|---|---|---|---|
| DE | 1232424 | | 1/1967 | |
| DE | 2826212 | | 3/1979 | |
| DE | 2910660 | | 9/1980 | |
| EP | 2405166 | | 1/2012 | |
| WO | 0023740 | | 4/2000 | |
| WO | WO 0023740 A1 ‡ | | 4/2000 | ........... F16K 31/082 |

OTHER PUBLICATIONS

International Preliminary Report on Patentability dated Jan. 12, 2016, issued in PCT Patent Application No. PCT/US2014/046006, 7 pages.
Examination Report dated Dec. 7, 2017, issued in European Patent Application No. 14 752 452.4, 5 pages.
Office Action dated Jun. 15, 2018, issued in Japanese Patent Application No. 2016-525459, 21 pages. English translation provided.
Examination Report dated Sep. 27, 2018, issued in European Patent Application No. 14 752 452.4, 5 pages.
Notice of Allowance dated May 14, 2019, issued in Japanese Patent Application No. 2016-525459, 3 pages.
Intent to Grant dated May 15, 2019, issued in European Patent Application No. 14 752 452.4, 5 pages.
Decision to Grant dated Oct. 4, 2019, issued in European Patent Application No. 14 752 452.4, 2 pages.
Office Action dated Jul. 30, 2020, issued in Canadian Patent Application No. 2,917,666, 3 pages.
Notice of Allowance dated Jun. 22, 2021, issued in Canadian Patent Application No. 2,917,666, 1 page.

\* cited by examiner
‡ imported from a related application

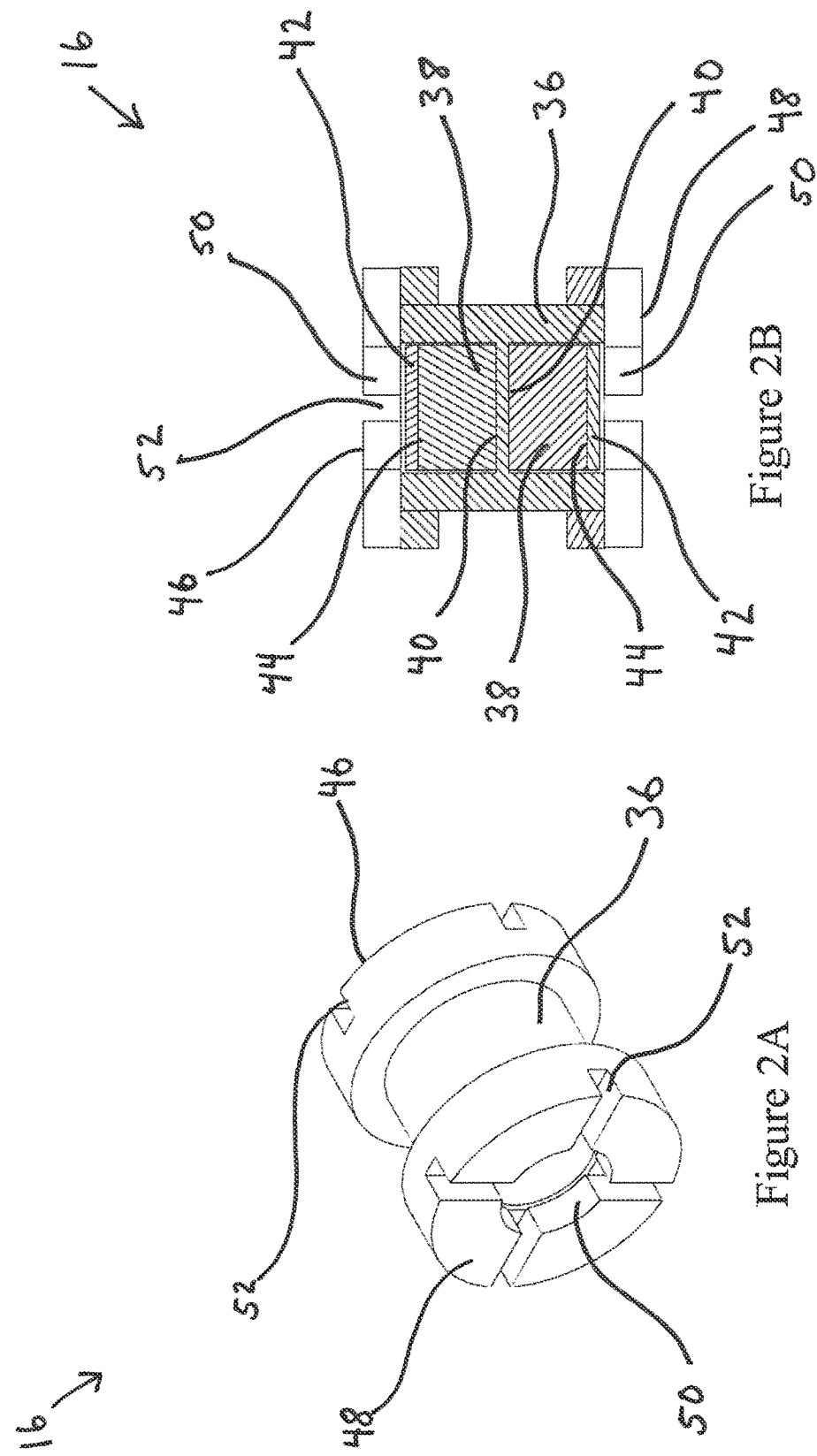

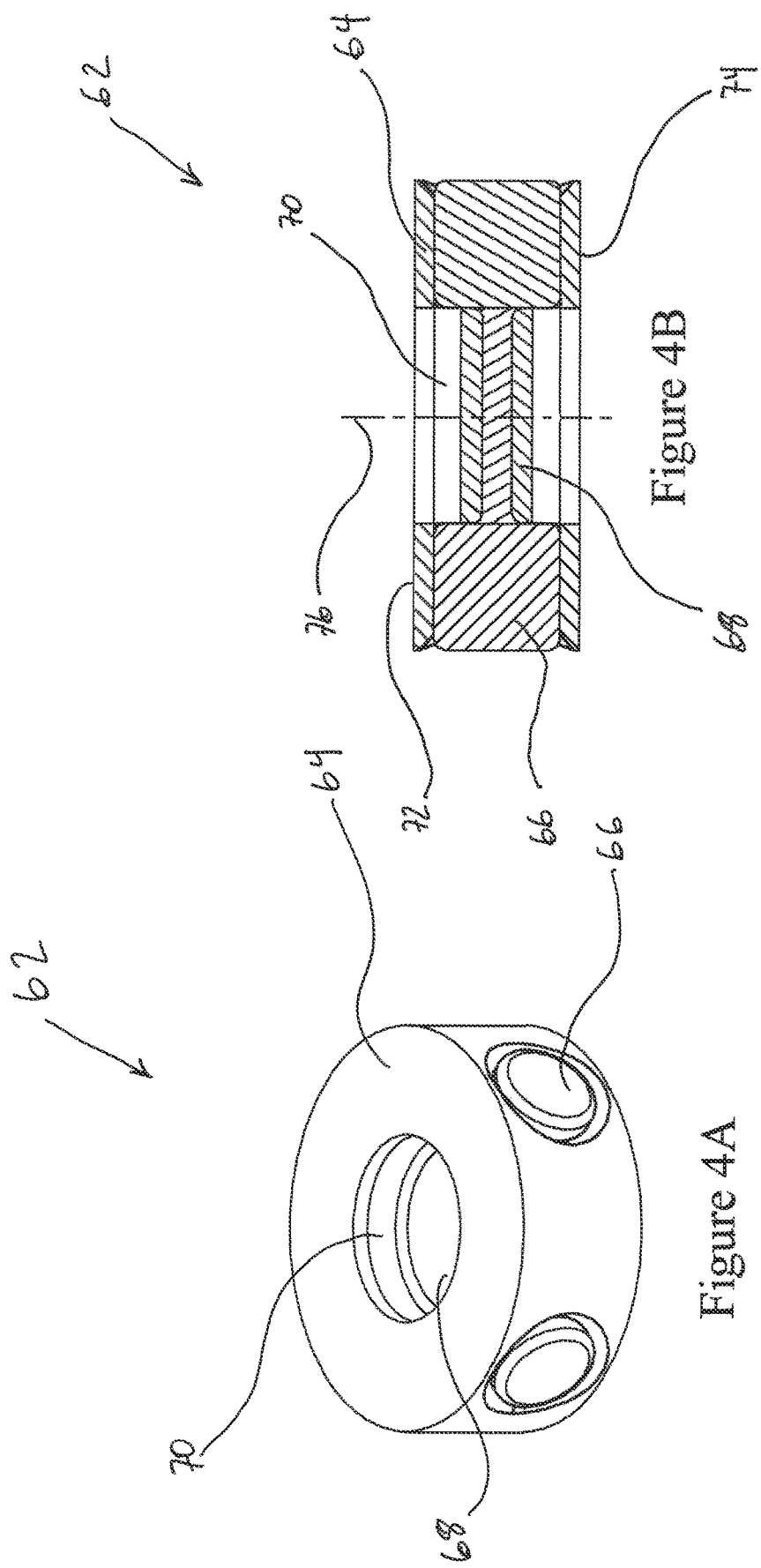

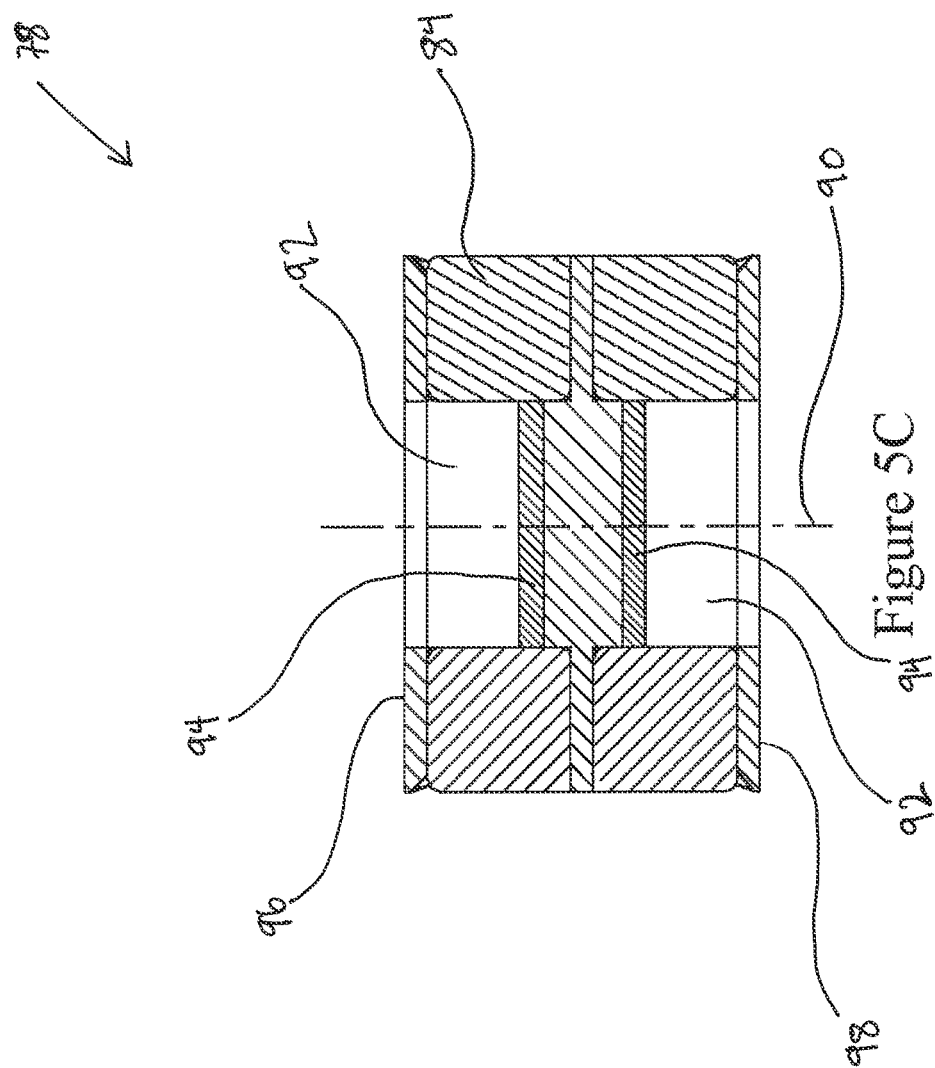

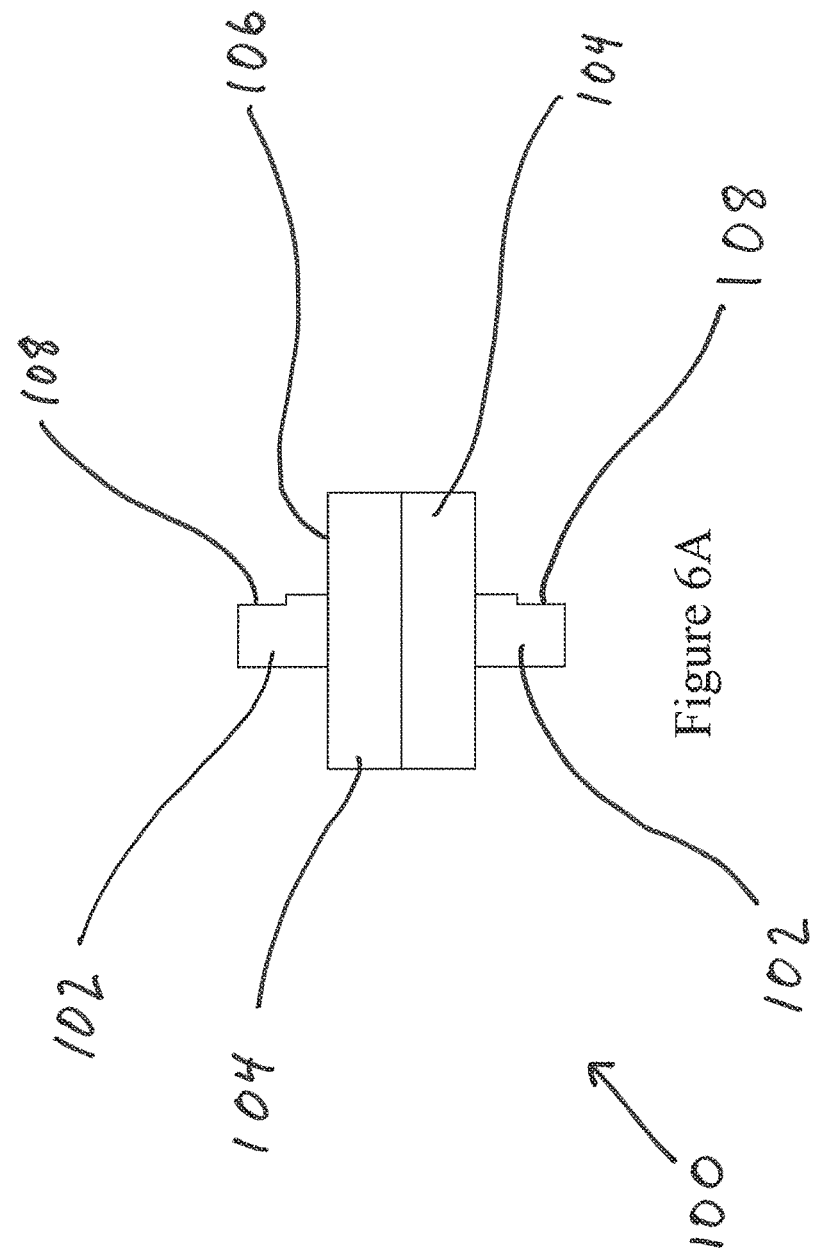

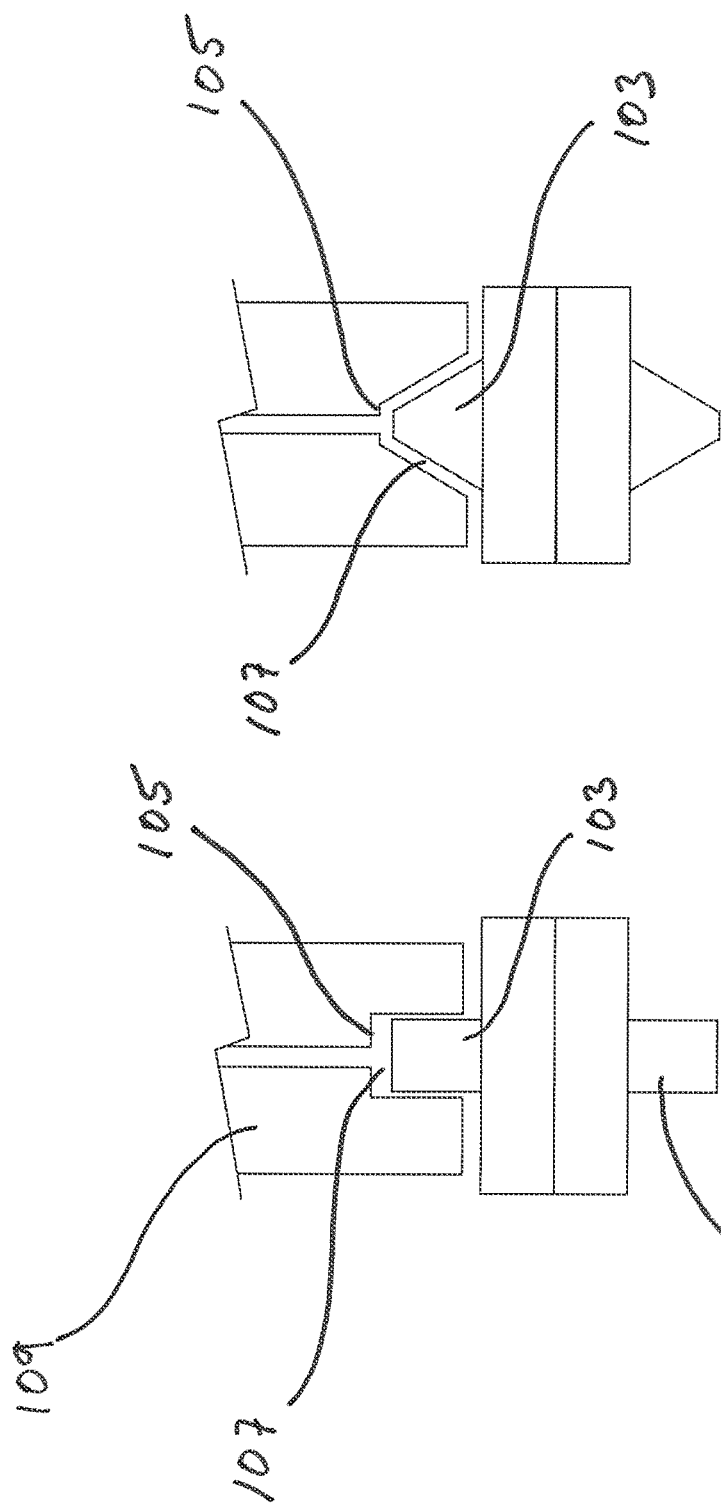

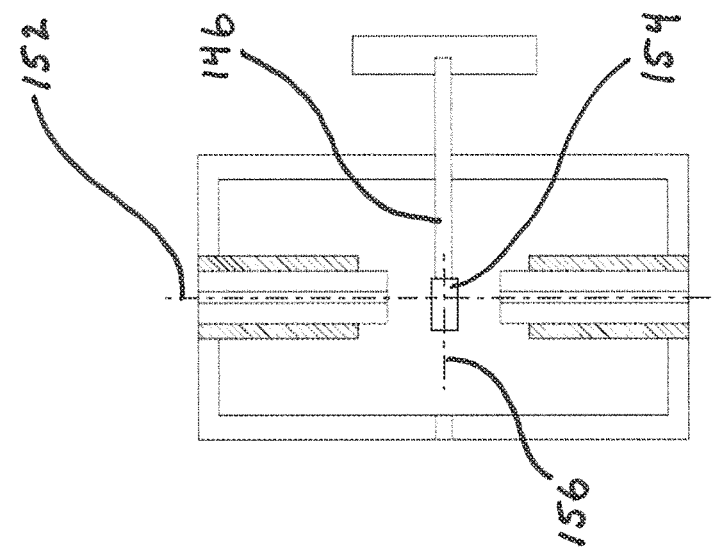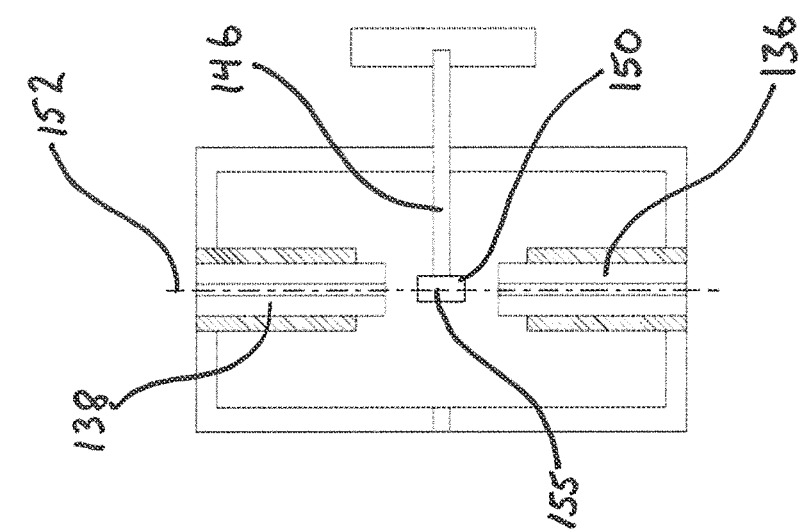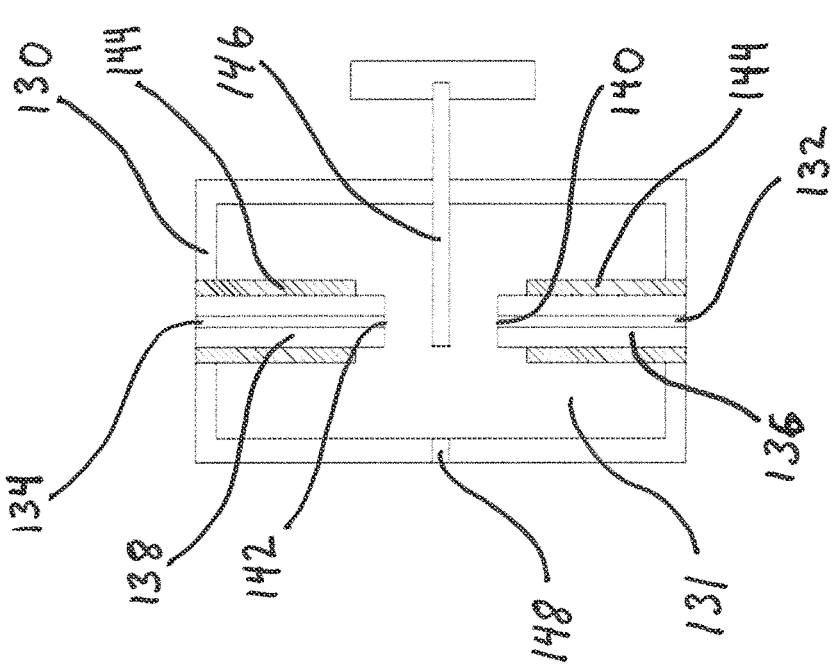

VALVE APPARATUS AND SYSTEM

CROSS REFERENCE TO RELATED APPLICATION(S)

The present application is a Continuation Application of U.S. patent application Ser. No. 14/327,2016, filed Jul. 9, 2014 and entitled Valve Apparatus and System, now U.S. Publication No. US-2015-0014558-A1, issued Jan. 15, 2015, which claims the benefit of U.S. Provisional Application Ser. No. 61/844,202 filed Jul. 9, 2013 and entitled Valve Apparatus and System, which is hereby incorporated herein by reference in its entirety.

FIELD OF THE INVENTION

This application relates generally to valves, and more particularly, to various valve apparatus and systems.

BACKGROUND

Traditionally, controlling the flow of a fluid may be accomplished by using a pneumatically, electrically or magnetically-actuated valve. These valves often require a constant source of current or fluid flow to stay in a particular position. In contrast, a bistable valve is stable in either position, and only requires energy input to switch positions. However, integrating pre-made bistable valves into a system may be overly complex and expensive.

SUMMARY OF THE INVENTION

In accordance with one implementation, a bistable valve is disclosed. The bistable valve includes an interior cavity; a first pressure source connected to the interior cavity; a second pressure source connected to the interior cavity; a first post connected to the interior cavity at a first end of the interior cavity; a second post connected to the interior cavity at a second end of the interior cavity; a magnetic shuttle located within the interior cavity; a first electromagnetic coil disposed about the first post; a second electromagnetic coil disposed about the second post; wherein when the first electromagnetic coil is energized, the first electromagnetic coil supplies a magnetic charge to the first post and actuates the magnetic shuttle to move towards the first end of the interior cavity towards the first post and seal the first pressure source, and wherein when the second electromagnetic coil is energized, the second electromagnetic coil supplies a magnetic charge to the second post and actuates the magnetic shuttle to move towards the second end of the interior cavity towards the second post and seal the second pressure source.

Some embodiments of this implementation may include one or more of the following features. Wherein the first post is in fluid communication with the first pressure source and the second post is in fluid communication with the second pressure source. Wherein the valve further including a first and second pressure inlet, the first and second pressure inlet fluidly connected to the first and second pressure source. Wherein the interior valve cavity located between the first and second post. Wherein the magnetic shuttle comprising a first membrane portion, a magnet portion and a second membrane portion, the first and second membrane portions attached to the magnet portion on opposite ends of the magnet portion. Wherein the shuttle is sealed against the first post in a first configuration and wherein the shuttle is sealed against the second post in a second configuration. Wherein the first post comprising a first membrane and wherein the second post comprising a second membrane. Wherein the first post and the second post further comprising at least one stabilizing feature. Wherein the valve further includes an output orifice in fluid communication with the valve cavity.

In accordance with one implementation, a bistable valve is disclosed. The bistable valve includes an interior cavity; a first pressure source connected to the interior cavity; a second pressure source connected to the interior cavity; a magnetic shuttle located within the interior cavity; and at least one electromagnetic coil that actuates the magnetic shuttle; wherein when the electromagnetic coil is energized, the electromagnetic coil supplies a magnetic charge that actuates the magnetic shuttle to move towards a first end of the interior cavity and seal the first pressure source.

Some embodiments of this implementation may include one or more of the following features. Wherein the valve further includes a first post and a second post, wherein the first post is in fluid communication with the first pressure source and the second post is in fluid communication with the second pressure source. Wherein the valve further includes a first electromagnetic coil disposed about the first post wherein, when energized, the electromagnetic coil supplies magnetic charge to the first post. Wherein the valve further includes a second electromagnetic coil disposed about the second post wherein, when energized, the electromagnetic coil supplies magnetic charge to the second post. Wherein the valve further includes a first post and a second post. Wherein the first post and the second post further comprising at least one stabilizing feature. Wherein the valve further includes a first electromagnetic coil disposed about the first post wherein, when energized, the electromagnetic coil supplies magnetic charge to the first post. Wherein the valve further includes a second electromagnetic coil disposed about the second post wherein, when energized, the electromagnetic coil supplies magnetic charge to the first post. Wherein the valve further includes a first and second pressure inlet, the first and second pressure inlet fluidly connected to the first and second pressure source. Wherein the magnetic shuttle is disposed within the interior valve cavity and wherein the interior valve cavity located between the first and second post. Wherein the magnetic shuttle comprising a first membrane portion, a magnet portion and a second membrane portion, the first and second membrane portions attached to the magnet portion on opposite ends of the magnet portion. Wherein the shuttle is sealed against the first pressure source in a first configuration and wherein the shuttle is sealed against the second pressure source in a second configuration.

In accordance with one implementation, a bistable valve suitable for integration into a plurality of systems is disclosed. The bistable valve is stable in multiple states, requiring energy only to switch between states. In one aspect, the bistable valve includes a valve manifold defining an interior valve cavity having a common output orifice, a first and second pressure source within the interior valve cavity, and a magnetically actuated shuttle that is capable of sealing either the first or second pressure source. When a pressure source is sealed by the shuttle, the sealed pressure source is not in fluid communication with the common output orifice, but the non-sealed pressure source is. When actuated, the shuttle switches from sealing one pressure source to sealing the other. The shuttle can be actuated by energizing one or both pressure sources with a magnetic charge using an electromagnetic coil such that the shuttle is acted upon by either an attractive or repellant magnetic force, or both. The net magnetic force acting on the shuttle causes the actuation because the shuttle includes multiple magnets.

The details of one or more embodiments are set forth in the accompanying drawings and the description below. Other features and advantages will become apparent from the description, the drawings, and the claims.

BRIEF DESCRIPTION OF THE DRAWINGS

FIG. 2A is a perspective view of one embodiment of a shuttle;

FIG. 2B is a cross-sectional view of the shuttle of FIG. 2A, showing two disk magnets oriented back-to-back;

FIG. 4A is a perspective view of one embodiment of a shuttle showing multiple radially-oriented magnets;

FIG. 4B is a cross-sectional view of the shuttle of FIG. 4A showing multiple radially-oriented magnets;

FIG. 5C is a cross-sectional view of the shuttle of FIG. 5A, showing multiple radially-oriented magnets in a stacked pattern;

FIG. 6A is a front view of one embodiment of a shuttle having guide posts on either side of the shuttle;

FIG. 6B is a cross-sectional view of one embodiment of a shuttle having elastomer guide posts that seal on a shelf within a cavity;

FIG. 6C is a cross-sectional view of one embodiment of a shuttle having conical elastomer guide posts that seal on a shelf within a cavity;

FIG. 9A is a cross-sectional view of one embodiment of a valve apparatus and system, this embodiment utilizing a cantilever armature instead of a shuttle;

FIG. 9B is a cross-sectional view of one embodiment of a valve apparatus and system, this embodiment using an axially-oriented magnet in conjunction with the cantilever armature from the embodiment in FIG. 9A;

FIG. 9C is a cross-sectional view of one embodiment of a valve apparatus and system, this embodiment using a radially-oriented magnet in conjunction with the cantilever armature from the embodiment in FIG. 9A;

Like reference symbols in the various drawings indicate like elements.

DETAILED DESCRIPTION

Figure 1A:
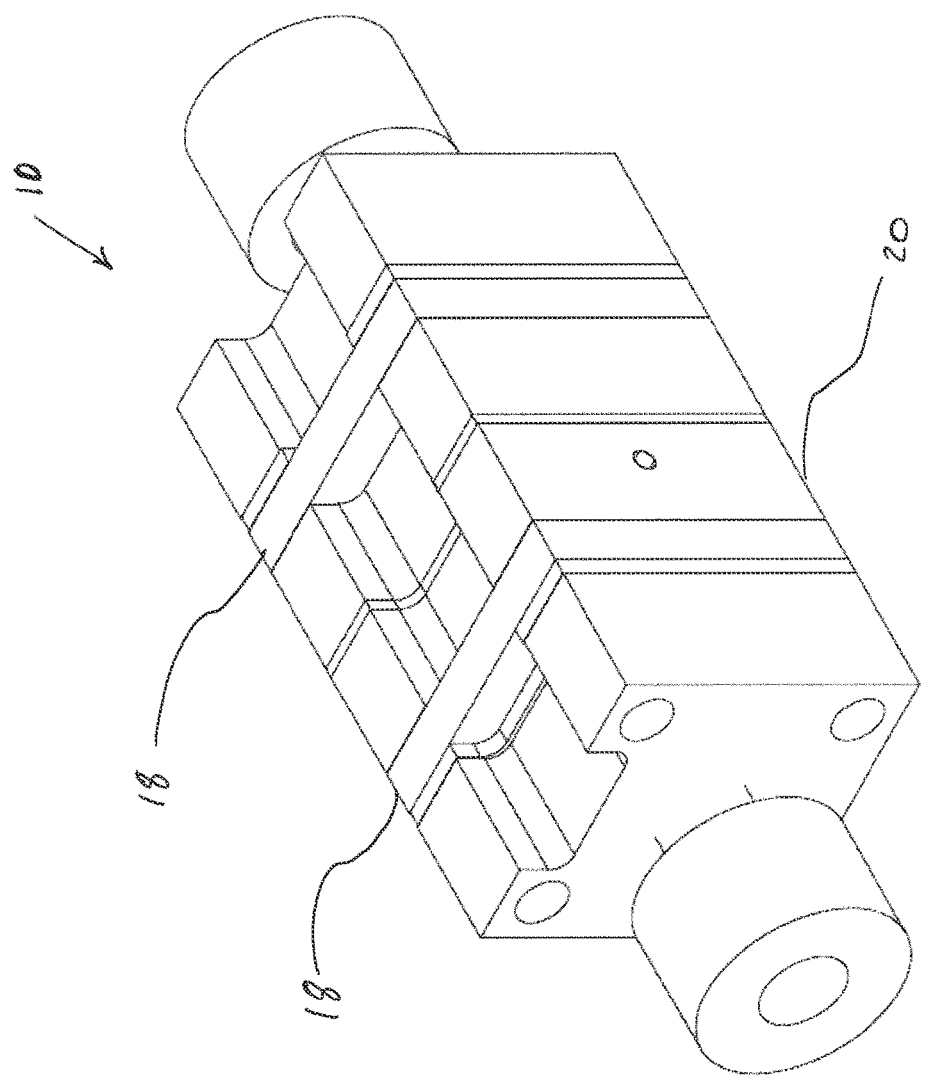
FIG. 1A is a perspective view of the one embodiment of a bistable valve.
Figure 1C:
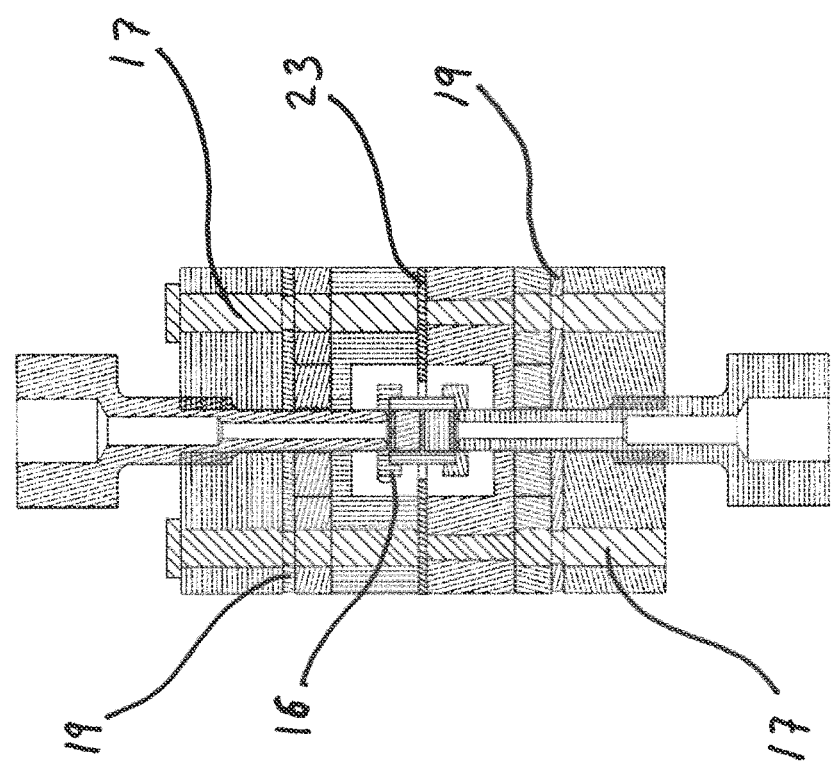
FIG. 1C is another cross-sectional view of the embodiment of FIG. 1A, further showing fasteners.
Figure 1B:
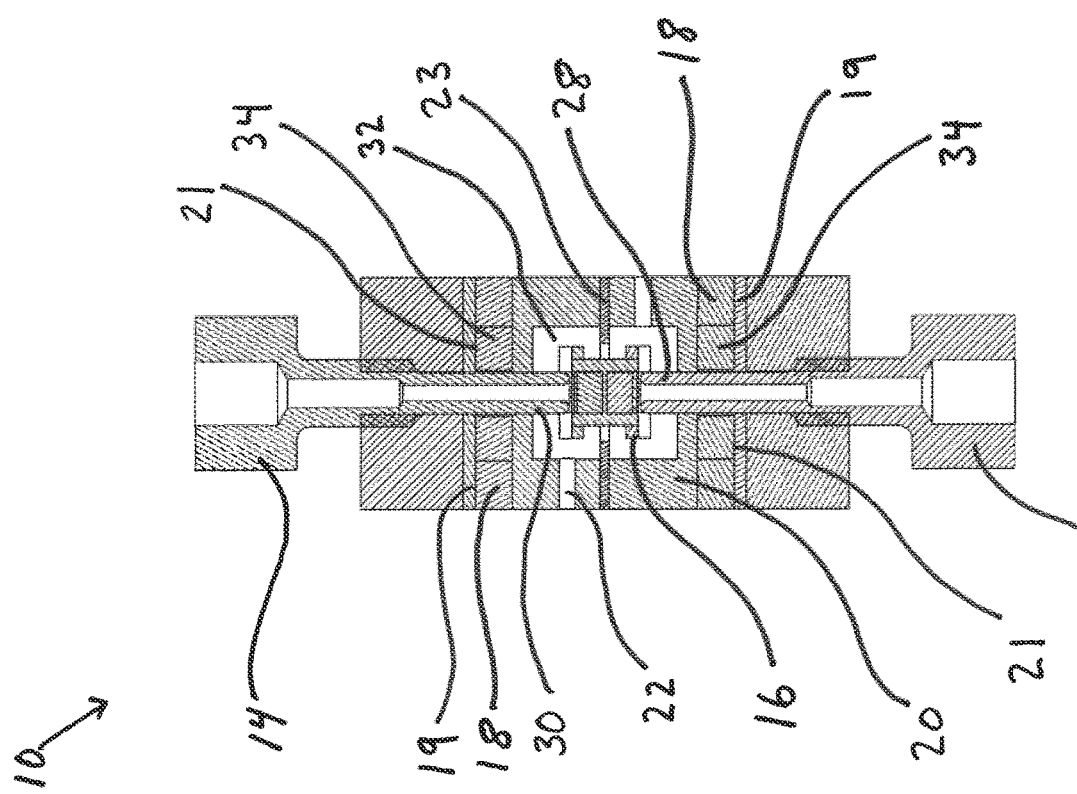
FIG. 1B is a cross-sectional view of one embodiment of a bistable valve with a shuttle capable of being actuated by electromagnets.
Figure 1E:
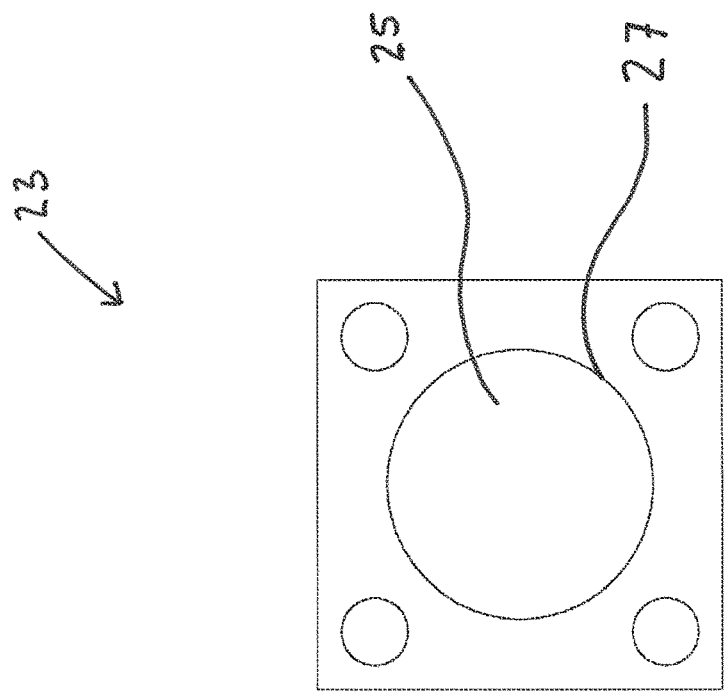
FIG. 1E is a top view of a ring plate according to one embodiment.
Figure 1D:
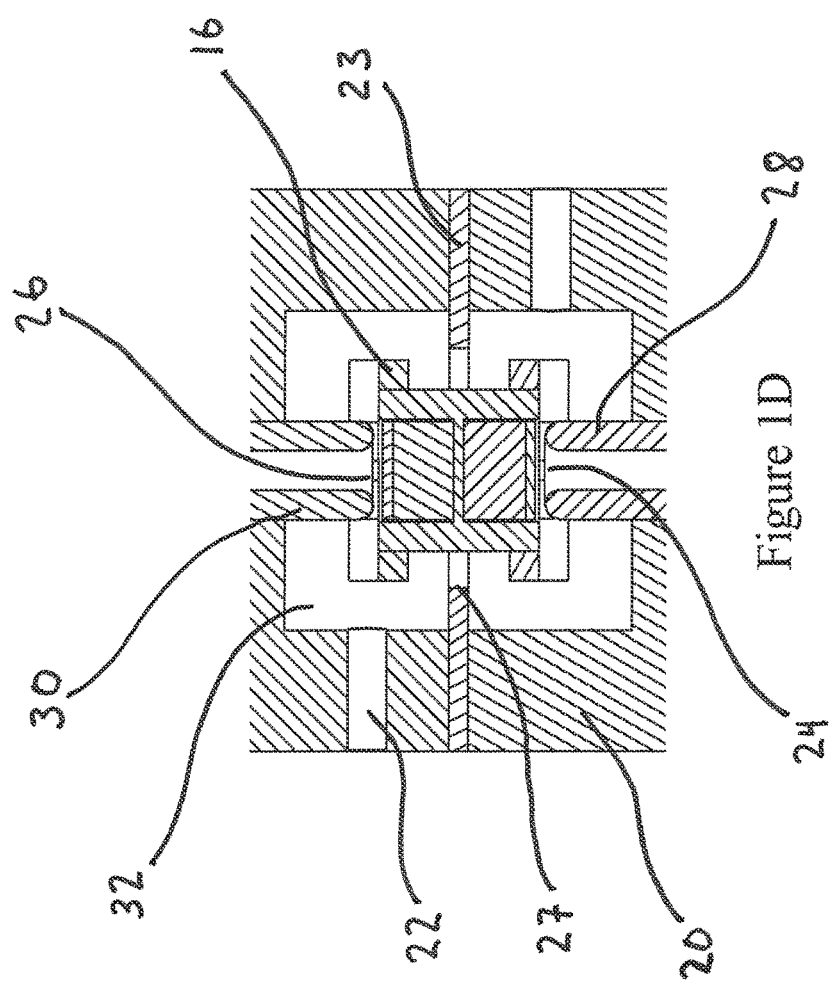
FIG. 1D is a partial cross-sectional view of the embodiment of FIG. 1A more closely showing the shuttle capable of being actuated by electromagnets of the bistable valve.

One embodiment of a valve apparatus and system is illustrated in FIGS. 1A-1E. This embodiment of the bistable valve 10 includes a first pressure source 12, a second pressure source 14, a shuttle 16, multiple circuit boards 18, each having at least one electromagnetic coil 34 to actuate the shuttle 16, a valve manifold 20 having an interior valve cavity 32, and a common output orifice 22 in fluid communication with the valve cavity 32.

The first pressure source 12, in various embodiments, may have a hollow post portion 28 extending into the valve cavity 32. In some embodiments, this may be constructed of a ferrous material. Similarly, the second pressure source 14 has a hollow post portion 30 extending into the valve cavity 32 substantially opposite from the first pressure post 28 and may also be constructed of a ferrous material in various embodiments. In various embodiments, the first pressure post 28 may include a first pressure orifice 24, which is in fluid communication with the first pressure source 12. Similarly, the second pressure post 30 may have a second pressure orifice 26 which may be in fluid communication with the second pressure source 14.

A first circuit board 18 having a first electromagnetic coil 34 is disposed around the first pressure post 28 such that, when energized, the first electromagnetic coil 34 supplies a magnetic charge to the first pressure post 28. Similarly, a second circuit board 18 having a second electromagnetic coil 34 is disposed around the second pressure post 30 such that, when energized, the second electromagnetic coil 34 supplies a magnetic charge to the second pressure post 30. An outer plate 19 constructed of a ferrous material, in various embodiments, may be disposed around each of the first pressure post 28 and the second pressure post 30, and abutting to an insulatory layer on the outer edge 21 of each of the circuit boards 18. In various embodiments, each of the outer plates 19 are connected to each other by way of fasteners 17 also constructed of a ferrous material. Various embodiments further include a ring plate 23 constructed of a ferrous material and having a central opening 25 defined by an inner edge 27, disposed in the valve manifold 20 such that the ring plate 23 is in contact with each fastener 17 and the central opening 25 surrounds the shuttle 16 within the interior valve cavity 32. The outer plates 19 and fasteners 17 form a box of ferrous material surrounding the electromagnetic coils 34, the first pressure post 28, the second pressure post 30, the ring plate 23, and the shuttle 16. In various embodiments, the outer plates 19, fasteners 17, ring plate 23, first pressure post 28 and second pressure post 30 are all constructed of a ferrous material including, but not limited to, iron, stainless steel or a nickel-iron alloy such as mu metal or, more specifically, a 42 nickel-iron alloy, the composition of which contains approximately 42% nickel.

In various embodiments, the shuttle 16 is either sealed against the first pressure orifice 24 in a first stable position such that the second pressure orifice 26 is in fluid communication with the interior valve cavity 32, but the first pressure orifice 24 is not, or, alternatively, the shuttle 16 is sealed against the second pressure orifice 26 in a second stable position such that the first pressure orifice 24 is in fluid communication with the interior valve cavity 32, but the second pressure orifice 26 is not. In each static sealing position, the shuttle 16 is held in place by a magnetic attraction from the shuttle 16 to either the first pressure post 28 or the second pressure post 30, whichever is being sealed.

To switch the position of the shuttle 16 from sealing against the first pressure orifice 24 to sealing against the second pressure orifice 26, the electromagnetic coils 34 disposed around each of the second pressure post 30 and the first pressure post 28 are energized such that the first pressure post 28 exerts a repellant force on the shuttle 16, while the second pressure post 30 exerts an attractive force on the shuttle 16. In various embodiments, both forces are sufficient enough that, working in conjunction, the attractive and repellant forces are enough to overcome the magnetic force currently holding the shuttle 16 to the first pressure orifice 24. Once this occurs, the shuttle 16 moves linearly through the valve cavity 32 from sealing the first pressure orifice 24 to sealing the second pressure orifice 26. Once this switch occurs, the electromagnetic coils 34 cease to be energized and the shuttle 16 is retained against the second pressure orifice 26 through a static magnetic attraction.

Similarly, to switch the position of the shuttle 16 from sealing against the second pressure orifice 26 to sealing against the first pressure orifice 24, the electromagnetic coils 34 disposed around each of the first pressure post 28 and the second pressure post 30 are energized such that the second pressure post 30 exerts a repellant force on the shuttle 16, while the first pressure post 28 exerts an attractive force on the shuttle 16. Both forces are sufficient enough that, working in conjunction, the attractive and repellant forces are enough to overcome the magnetic force statically holding the shuttle 16 to the second pressure orifice 26. Once this occurs, the shuttle 16 moves linearly through the valve cavity 32 from sealing the second pressure orifice 26 to sealing the first pressure orifice 24. Once this switch occurs, the electromagnetic coils 34 cease to be energized and the shuttle 16 is retained against the first pressure post 28 through a static magnetic attraction.

In various embodiments, the electromagnetic coils are both energized in series in one polarity to actuate the shuttle in one direction. Similarly, to actuate the shuttle in the opposite direction, both electromagnetic coils are energized together in series in the opposite polarity.

In various embodiments, the coils 34 are energized by way of discharging current from a charged capacitor. Once the capacitor is depleted, current ceases to charge the respective coil 34, and the shuttle 16 is held against either the first pressure post 28 or the second pressure post 30, by way of static magnetic attraction while the capacitor recharges. Use of a capacitor to charge the electromagnetic coils 34 is beneficial/desirable for many reasons, including, but not limited to minimizing safety concerns. Use of a charged capacitor to energize the electromagnetic coils 34 may limit the amount of continuous current the coils 34 are exposed to thereby minimizing the risk of applying excessive current as well as decreasing the risk of fire and other thermal related failure. Another reason that use of a capacitor to charge the electromagnetic coils 34 is beneficial/desirable is it allows for smaller and cheaper construction of the present invention. One capacitor may be used to energize multiple valves, thereby avoiding the need to implement multiple sources of current into the valve application. However, in alternate embodiments, the electromagnetic coils may be energized by way of a continuous source of current.

In yet another embodiment, the bistable valve may only consist of a single electromagnetic coil used to actuate the shuttle 16 in both sealing positions.

Referring now also to FIGS. 2A and 2B, in various embodiments, the shuttle 16 includes a carrier 36 and two magnets 38, aligned concentrically and oriented back-to back with their closest corresponding faces 40 having the same polarity, and as such, exhibit a repelling force against each other. Various embodiments of the shuttle may include an elastomer layer 42 disposed on each magnet's outward face 44 and acts as a seal when the shuttle is actuated against either the first pressure orifice 24 or the second pressure orifice 26. In various embodiments, the elastomer layer 42 may be constructed of a pliant material which may include, but is not limited to, silicone and/or polyurethane. In some embodiments, each elastomer layer 42 may be retained in the shuttle 16 mechanically by portions of the shuttle 16 that overlap the edge of each elastomer layer 42 and sandwich it to the corresponding magnet's outward face 44. In some embodiments, each elastomer layer 42 may be retained in the shuttle by adhesive holding the elastomer to each magnet's outward face 44. In some embodiments, the elastomer layers 42 may be disposed on each magnet's outward face 44 by way of overmolding the entire magnet 38 with the elastomer material or applying a two-part elastomer material to the magnet 38. In some embodiments, each elastomer layer 42 may be obtained by sandwiching each magnet 38 between two sheets of elastomer material and melting portions of the sheets to each other in order to create a pocket of elastomer in which each magnet 38 resides. In some embodiments, the elastomer layer on one side of the shuttle may be thicker than the other side in order to decrease the sealing stability on the thicker side which may be beneficial/desirable for many reasons, including but not limited to, where failsafe operation is desired.

In some embodiments, either the first pressure orifice 24 or the second pressure orifice 26 is sealed against an elastomer layer 42 of the shuttle 16 by way of both the first pressure post 28 and the second pressure post 30 having a flat surface with rounded edges surrounding the first pressure orifice 24 and the second pressure orifice 26. In some embodiments, the shuttle 16 may seal using a conical geometry surrounding the first pressure orifice 24 and the second pressure orifice 26. In some embodiments, the shuttle 16 may seal using a conical geometry with a flat surface with a width of about 0.005 inches immediately surrounding both the first pressure orifice 24 and the second pressure orifice 26. In some embodiments, the shuttle 16 may seal using a hemispherical tip geometry surrounding both the first pressure orifice 24 and the second pressure orifice 26.

In some embodiments, the carrier 36 of the shuttle 16 may further include a guide cavity 50 in each side 46, 48 of the shuttle carrier 36 that circumscribes each elastomer layer 42 such that the guide cavity 50 envelopes a portion of both the first pressure post 28 and the second pressure post 30, regardless of which is being sealed. This may be beneficial/desirable for many reasons, including but not limited to, maintaining proper alignment with each pressure post. In various embodiments, the shuttle 16 may also include a plurality of air flow notches 52 in each side 46, 48 of the shuttle carrier 36 that enable fluid communication from the valve cavity 32, to either the first pressure orifice 24 or the second pressure orifice 26, whichever is not being sealed, by way of the corresponding guide cavity 50.

In some embodiments, the shuttle 16 may use the attractive magnetic force from each pressure post to maintain proper alignment. In some of these embodiments, guide cavities 50 may not be used.

Figure 2C:
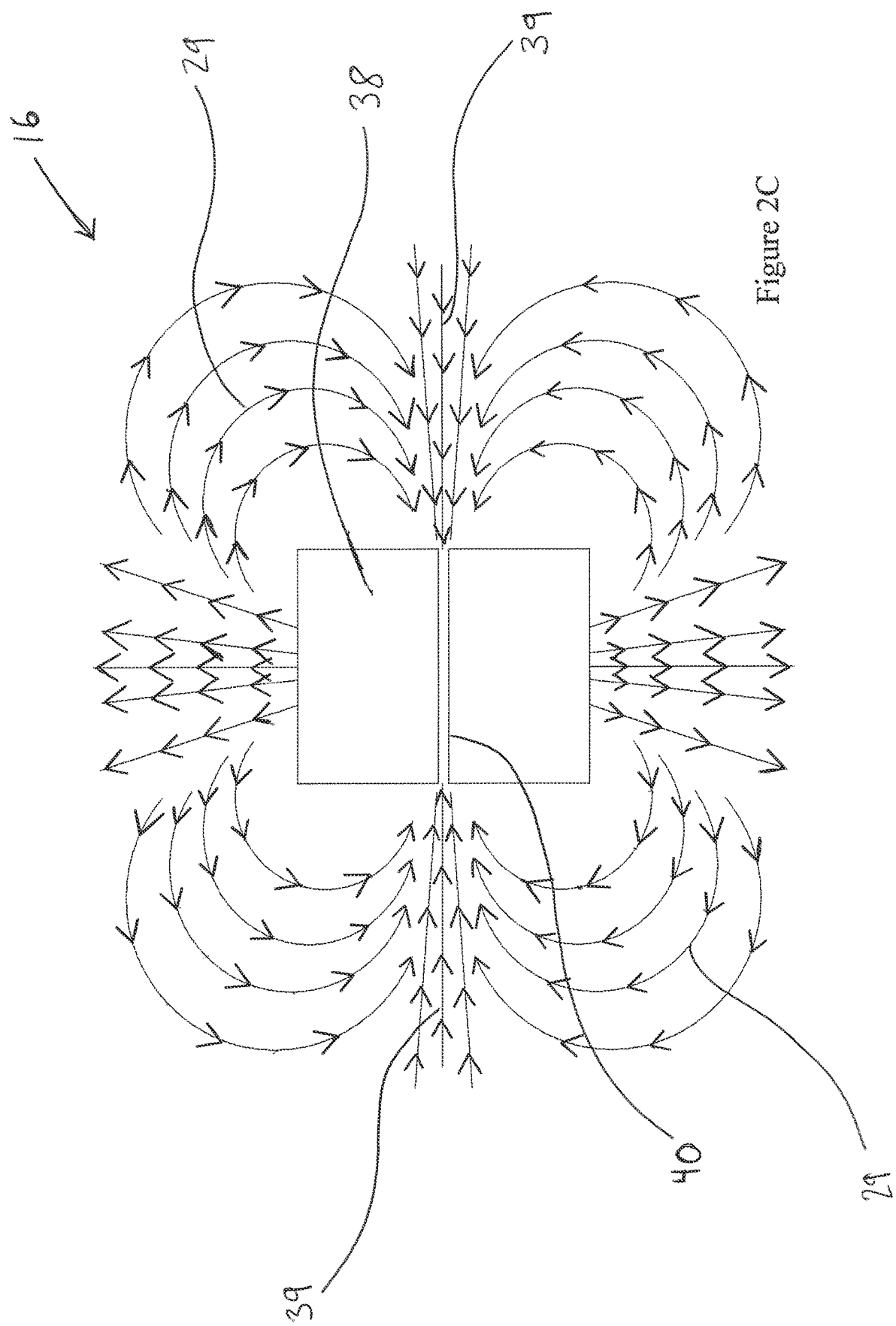
FIG. 2C is a view of the magnetization vector and magnetic flux path of one embodiment of a shuttle.
Figure 2D:
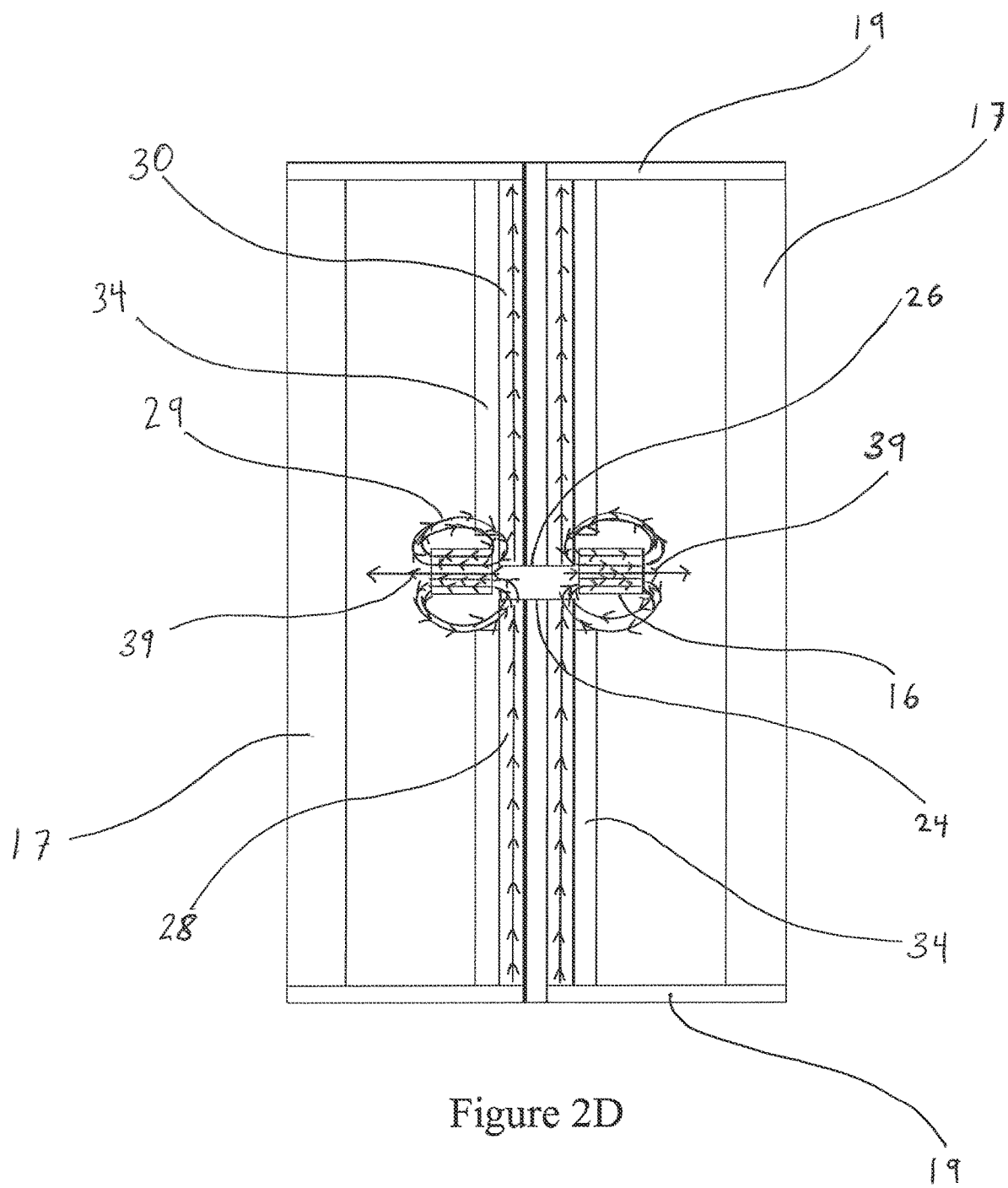
FIG. 2D is a view of the magnetic flux path of one embodiment when the shuttle is acted upon by an electromagnetic coil.

Referring now also to FIG. 2C, the magnetic flux path present in some embodiments of the shuttle 16 is shown. In some embodiments, the magnets 38 may be oriented back-to-back with their closest corresponding faces 40 having the same polarity, and as such, exhibit a repelling force against each other. When the magnets 38 are oriented in this manner, a radial magnetic vector 39 is created by the interaction of the magnets' 38 respective flux leakage paths 29, which are used to switch the position of the shuttle 16 when the electromagnetic coils 34 are sufficiently energized, as shown in FIG. 2D. When the shuttle 16 is sealed against the negative pressure orifice 26 and the electromagnetic coils 34 are energized such that they supply an attractive magnetic charge to the first pressure post 28 and a repellant magnetic charge to the second pressure post 30, the flux leakage paths 29 of the shuttle 16 may cause the attractive and repellant magnetic charges of the posts to repel the shuttle 16 away from the second pressure post 30 and attract towards the first pressure post 28 in order to switch the shuttle 16 to sealing against the first pressure orifice 24.

Similarly, when the shuttle 16 is sealed against the first pressure orifice 24 and the electromagnetic coils 34 are energized such that they supply an attractive magnetic charge to the second pressure post 30 and a repellant magnetic charge to the first pressure post 28, the flux leakage paths 29 of the shuttle 16 may cause the attractive and repellant magnetic charges of the posts to repel the shuttle 16 away from the first pressure post 28 and attract towards the second pressure post 30. This switches the shuttle 16 to sealing against the second pressure orifice 26.

Figure 2E:
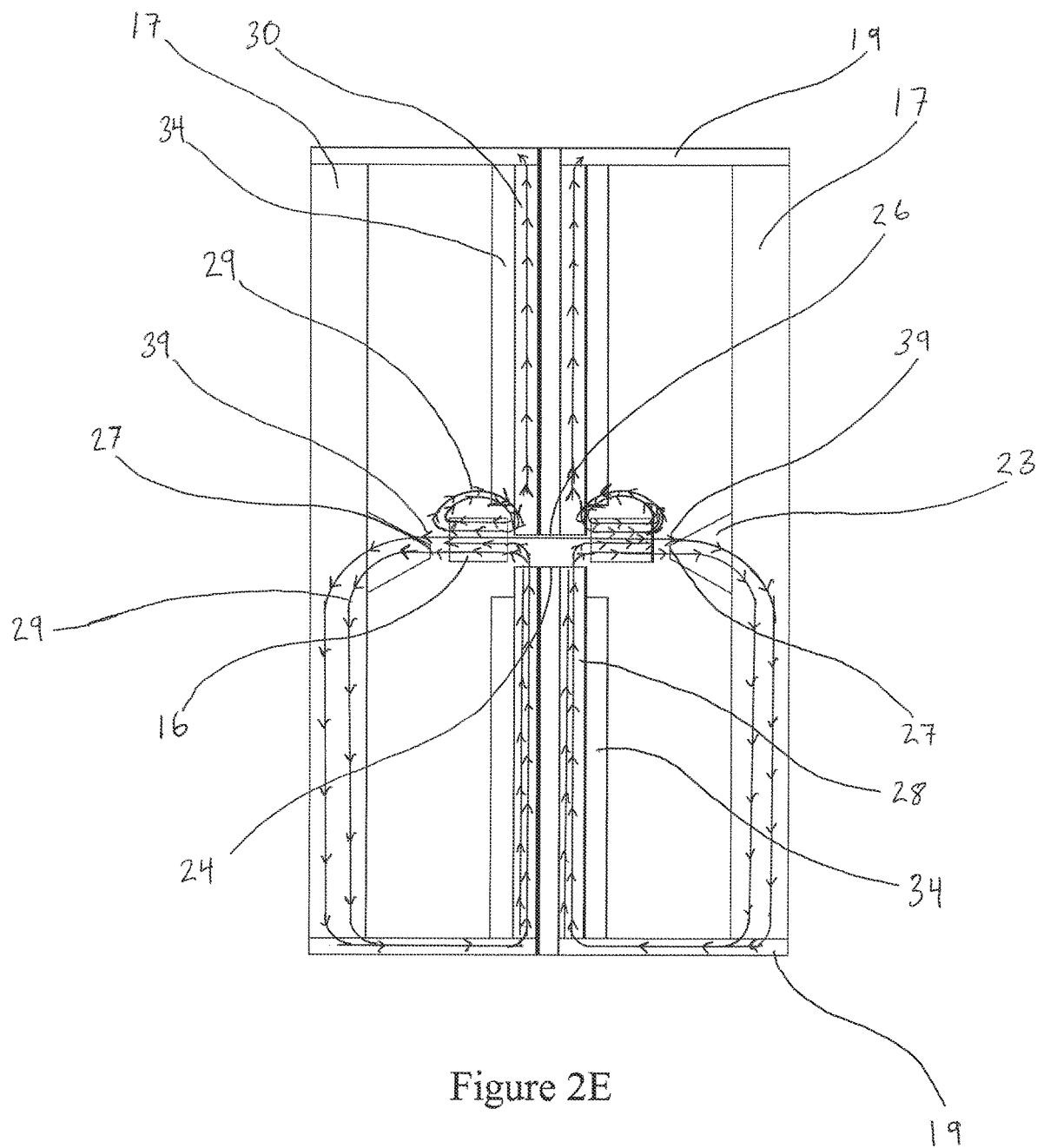
FIG. 2E is a view of the magnetic flux path of one embodiment, when the shuttle is acted upon by an electromagnetic coil and there is a ring plate to assist in the transfer of magnetic flux.

Referring now also to FIG. 2E, another embodiment is shown utilizing the ring plate 23 to assist in switching the position of the shuttle 16. In some embodiments, the ring plate 23 may be disposed around the shuttle 16 such that its inner edge 27 may be in close proximity to the shuttle 16 in either sealing position. In some embodiments, when the first pressure post 28 and the second pressure post 30 are energized such that they induce the shuttle 16 to switch sealing positions, the ring plate 23 allows the magnetic flux from the first pressure post 28 and the second pressure post 30 to more effectively travel through the fasteners 17 and the outer plates 19 to assist in attracting the flux leakage paths from one side of the shuttle 16 and repelling the flux leakage paths from the opposite side of the shuttle 16. This may result in the shuttle 16 switching positions.

Figure 2G:
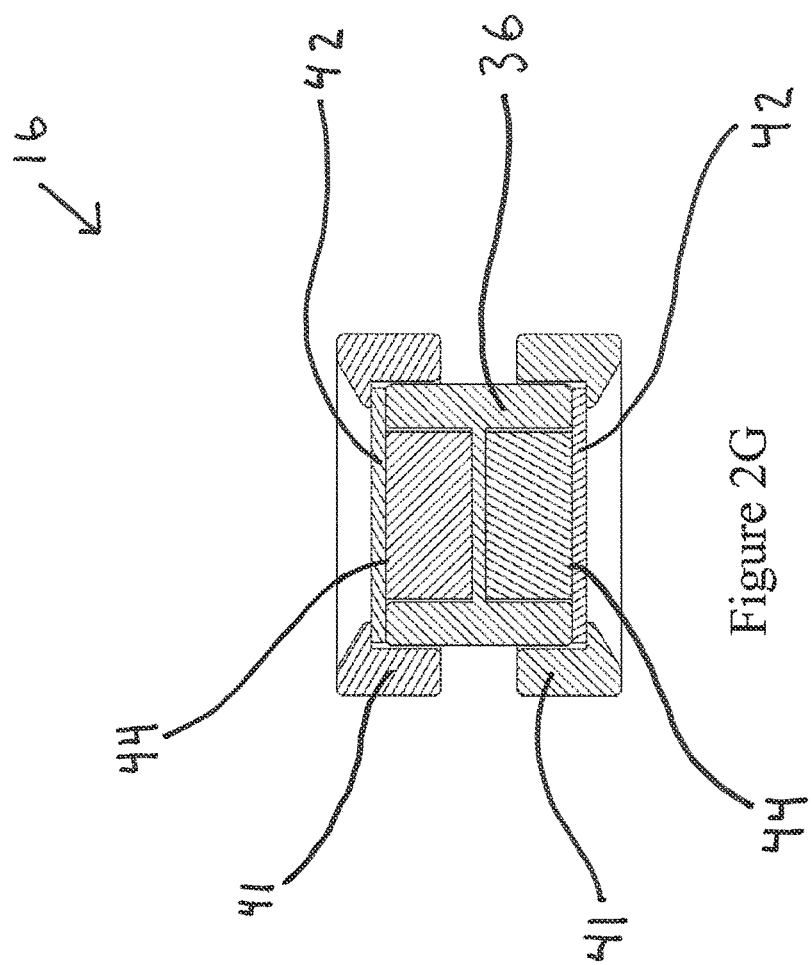
FIG. 2G is a cross-sectional view of the shuttle of FIG. 2F, showing mechanical retainers.
Figure 2F:
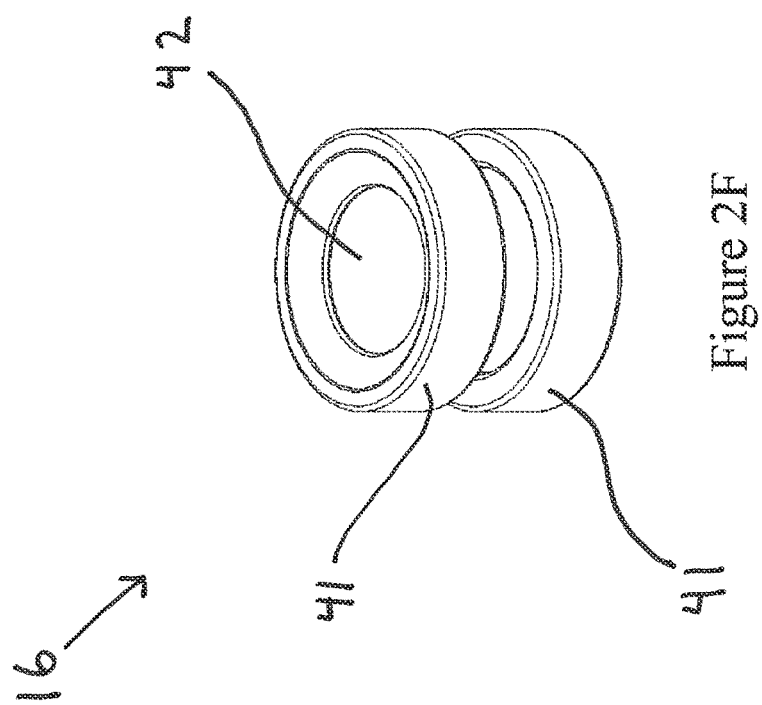
FIG. 2F is a perspective view of one embodiment of a shuttle having mechanical retainers.

Referring now to FIGS. 2F and 2G, in some embodiments, the shuttle 16 may include layers of elastomer 42 retained to the magnet faces 44 by way of mechanical retainers 41. In these embodiments, the shuttle 16 uses magnetic force from each of the pressure posts to maintain alignment and, as such, may not, in some embodiments, include any guide cavities.

Figure 3B:
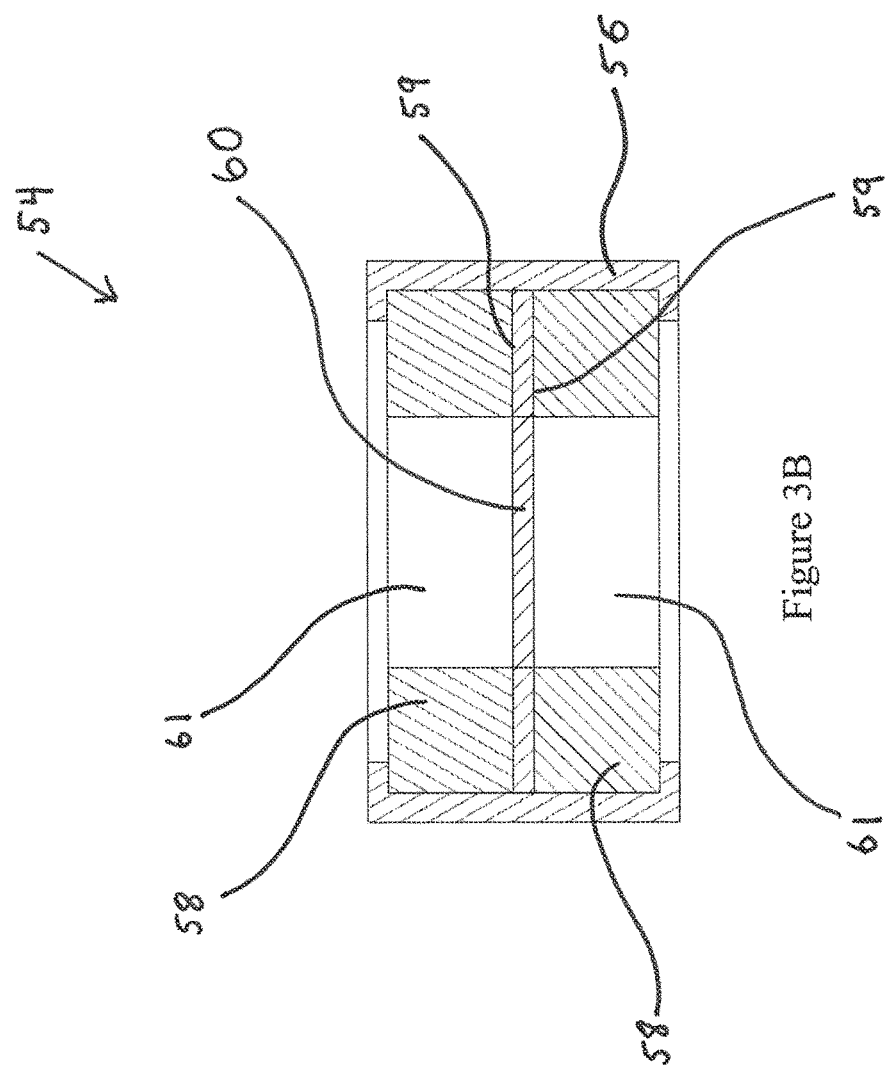
FIG. 3B is a cross-sectional view of the shuttle of FIG. 3A, showing two stacked ring magnets.
Figure 3A:
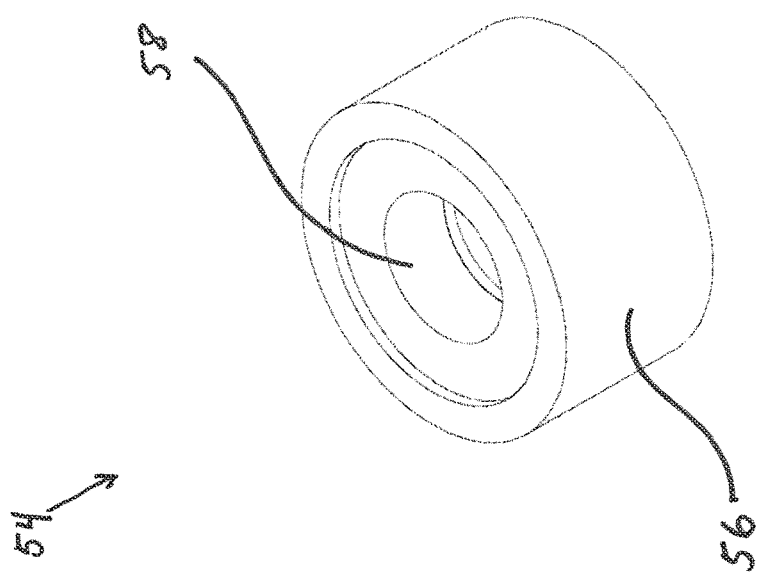
FIG. 3A is a perspective view of one embodiment of a shuttle showing two stacked ring magnets.

Referring now also to FIGS. 3A and 3B, in some embodiments, the shuttle 54 may include a carrier 56 and two ring magnets 58, aligned concentrically and oriented back-to-back with their closest corresponding faces 59 having the same polarity. As such, the two ring magnets 58 exhibit a repelling force against each other. A layer of elastomer 60 may also be disposed between the two ring magnets 58, in some embodiments, such that the central aperture 61 of each ring magnet is not in fluid communication with the other.

Figure 4D:
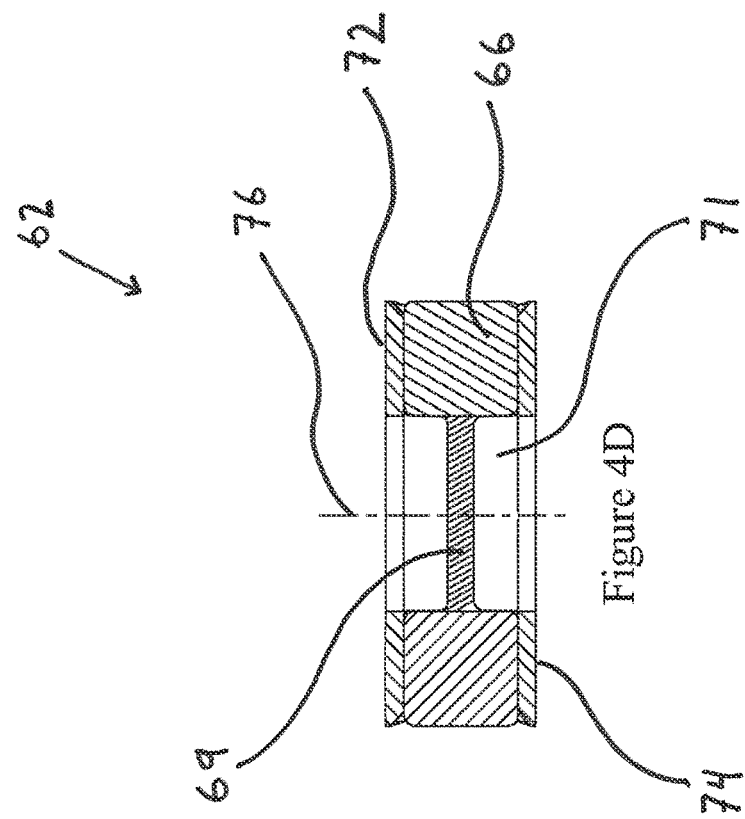
FIG. 4D is a cross-sectional view of one embodiment of a shuttle showing multiple radially-oriented magnets.
Figure 4C:
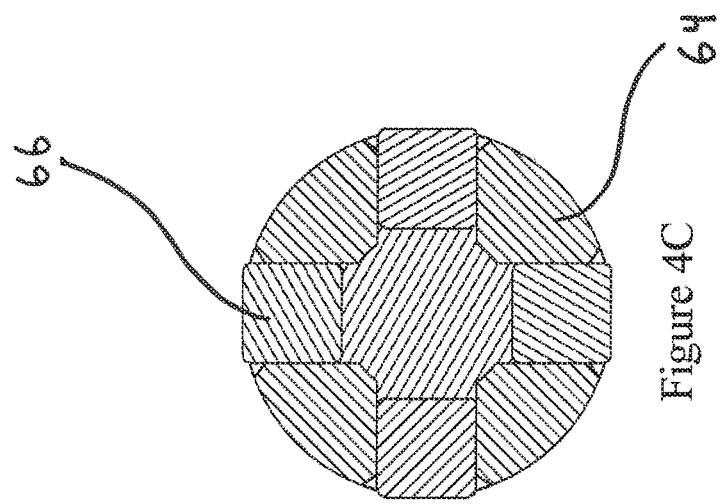
FIG. 4C is a top cross-sectional view of the shuttle of FIG. 4A showing multiple radially-oriented magnets.

Referring now also to FIGS. 4A and 4B, another embodiment of the shuttle 62 may includes a carrier 64, multiple magnets 66 arranged in a radial pattern around a central axis 76, and two central guide cavities 70 aligned coaxially with the central axis 76, one extending into a top surface 72 and the other extending into a bottom surface 74. Each radially-oriented magnet 66 may have a magnetization vector through its thickness, thereby giving the shuttle 62 an overall radial magnetization vector. In various embodiments, the shuttle 62 may further include a layer of elastomer 68 disposed in each of the two central guide cavities 70. In some embodiments, and as shown in FIG. 4D, the two central guide cavities 70 may be formed by disposing a layer of elastomer 69 in a central channel 71 that extends through the entire thickness of the shuttle 62 such that the elastomer 69 bisects the channel 71 and does not permit fluid communication from the top surface 72 to the bottom surface 74.

Figure 5B:
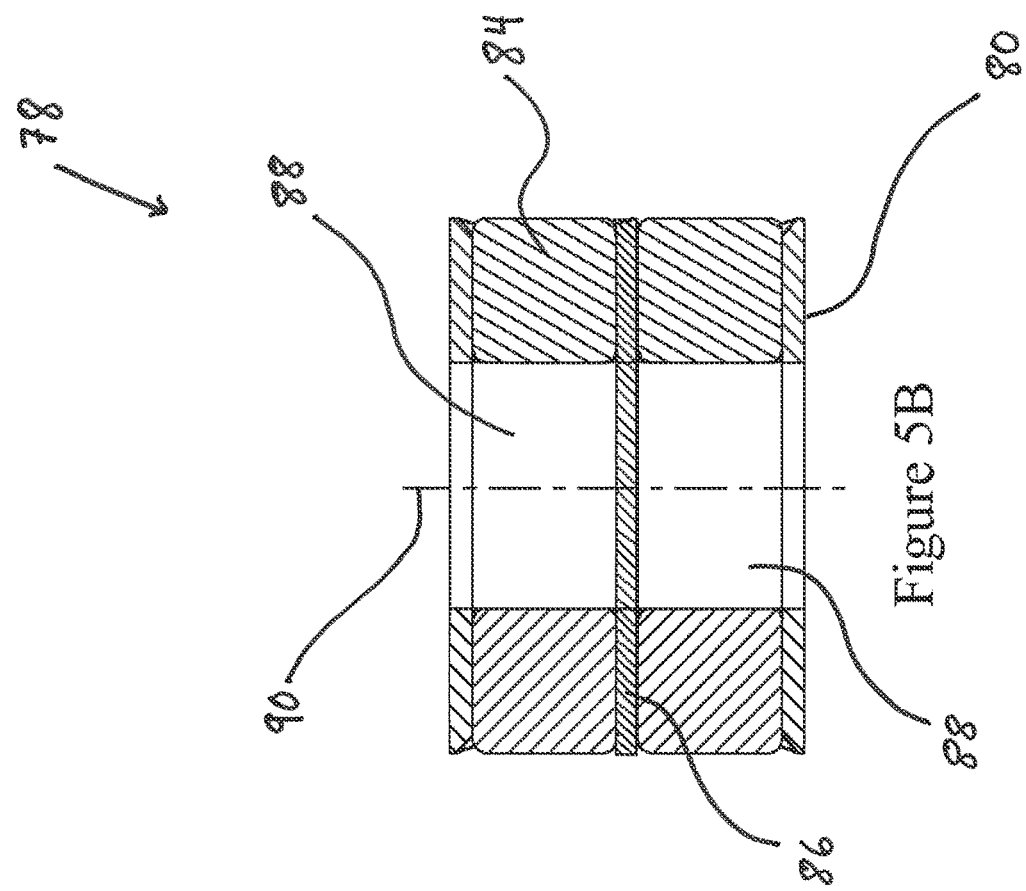
FIG. 5B is a cross-sectional view of the shuttle of FIG. 5A showing multiple radially-oriented magnets in a stacked pattern.
Figure 5A:
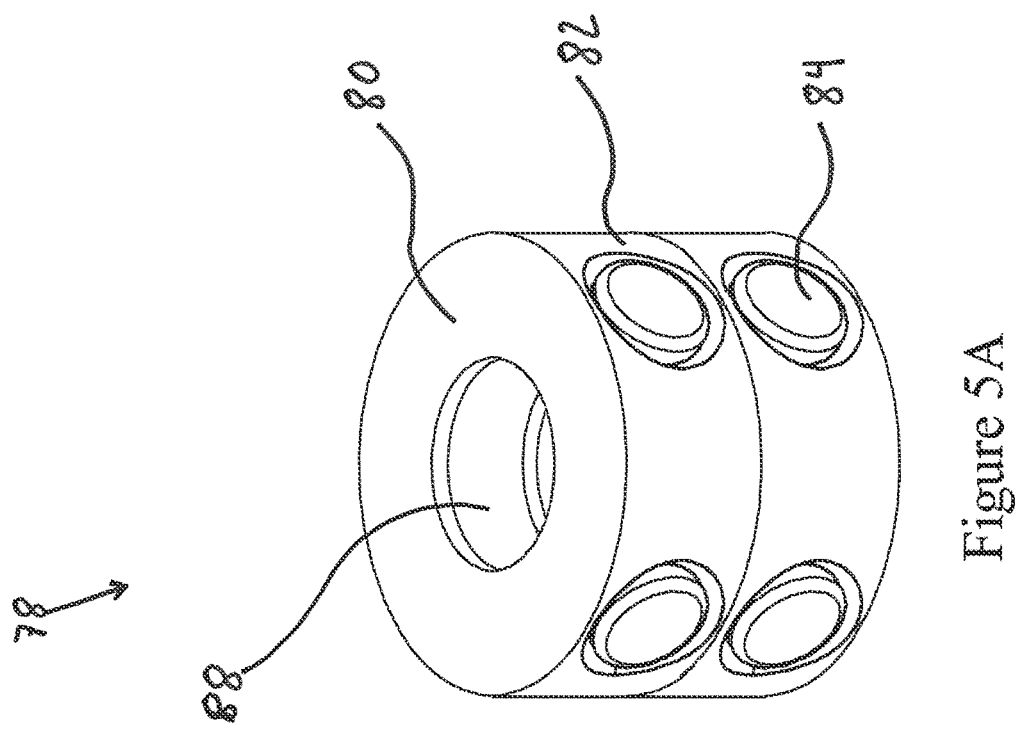
FIG. 5A is a perspective view of one embodiment of a shuttle showing multiple radially-oriented magnets in a stacked pattern.

Referring now also to FIGS. 5A and 5B, in some embodiments, the shuttle 78 may include a carrier 80, at least two concentrically-stacked layers 82, each having multiple magnets 84 arranged in a radial pattern around a central axis 90. Each radially-oriented magnet 84 may have a magnetization vector through its thickness, thereby giving the shuttle 78 an overall radial magnetization vector. In various embodiments, the shuttle 78 may include a central cavity 88 disposed along the central axis 90 and extending through the entire thickness of each layer 82. In various embodiments, the shuttle 78 may include a layer of elastomer 86 disposed between each of the concentrically-stacked layers 82 and completely covering the central cavity 88 of each layer 82 such that the central cavity 88 of each layer 82 is not in fluid communication with another.

Referring now to FIG. 5C, another embodiment of the shuttle 78 is shown. In some embodiments, the shuttle 78 may include two central guide cavities 92, aligned coaxially with the central axis 90, one extending into a top surface 96 of the shuttle 78, and the other extending into a bottom surface 98 of the shuttle 78. In various embodiments, the shuttle 78 may also include a layer of elastomer 94 disposed in each of the two central guide cavities 92.

In some embodiments, the embodiments of the shuttle 78 shown in FIGS. 5A and 5B may include two shuttles 62. In some embodiments, the two shuttles 62 may be those embodiments of the shuttle 62 shown in FIGS. 4A-4D that have been aligned coaxially and mated together. In various other embodiments, the two shuttles may be a different embodiment of the shuttle including, but not limited to, the various embodiments of the shuttle described herein.

Referring now also to FIG. 6A, in some embodiments, the shuttle 100 may include two magnets 104 oriented back-to-back and two posts 102 extending from the outward faces 106 of each magnet 104. Each post 102 may be disposed such that, when the bistable valve 10 is assembled, the posts 102 may be positioned in both the first hollow post portion 28 and the second hollow post portion 30. This may be beneficial/desirable for many reasons, including but not limited to, eliminating the need for guide cavities in the shuttle. In some embodiments, each post 102 has a cutout 108 to facilitate fluid flow from the unsealed orifice.

Referring now also to FIGS. 6B and 6C, in some embodiments, the post 103 may be constructed of an elastomer material and may seal against a shelf 105 disposed within a cavity 107 of the applicable post 109. In some embodiments, the embodiment of the elastomer post 103 shown in FIG. 6B may be constructed of a conical geometry and seals against the shelf 105 of the cavity 107 which may be constructed of a mating conical geometry as seen in FIG. 6C.

Figure 7:
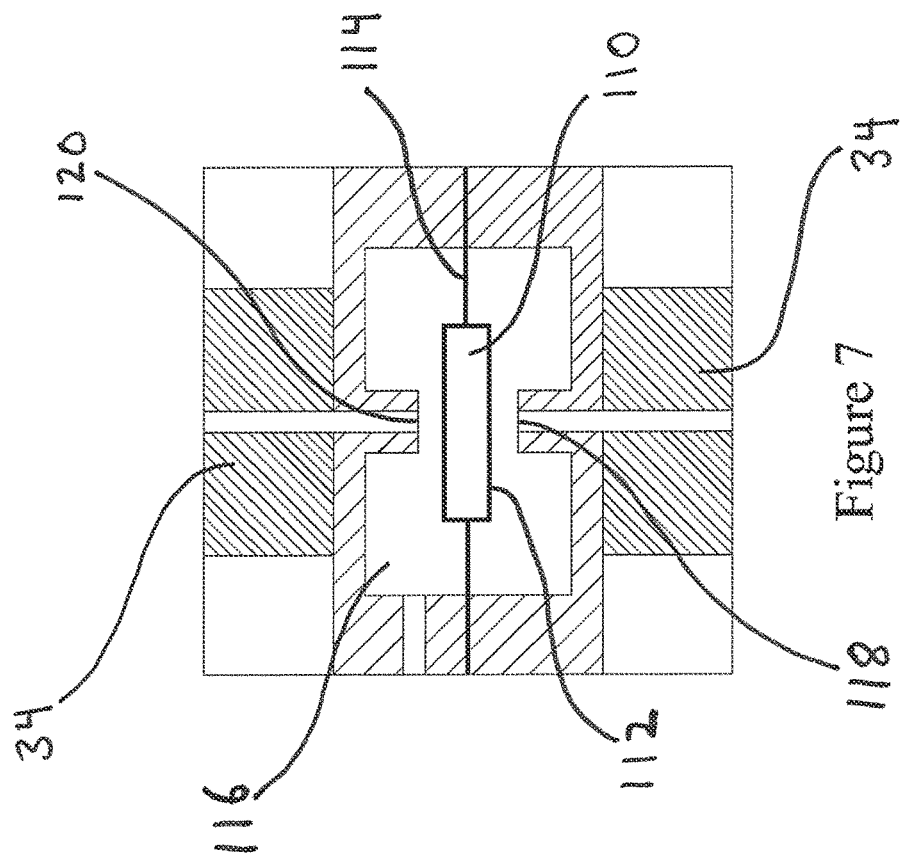
FIG. 7 is a cross-sectional view of one embodiment of a valve apparatus and system where the shuttle is encased in a membrane.

Referring now also to FIG. 7 in some embodiments, the shuttle 110 may be encased in a membrane portion 112 and suspended by a membrane portion 114 in an interior valve cavity 116. The membrane portion 114, in some embodiments, may be perforated to allow pressure equalization in the interior valve cavity 116. In some embodiments, the membrane portion 112 encasing the shuttle 110 may not be perforated, however, and may act as a seal to prevent fluid communication between the interior valve cavity 116 and either a first pressure orifice 118 or a second pressure orifice 120. In some embodiments, the membrane may be sandwiched between the shuttle's sides instead of enveloping the shuttle.

Figure 8:
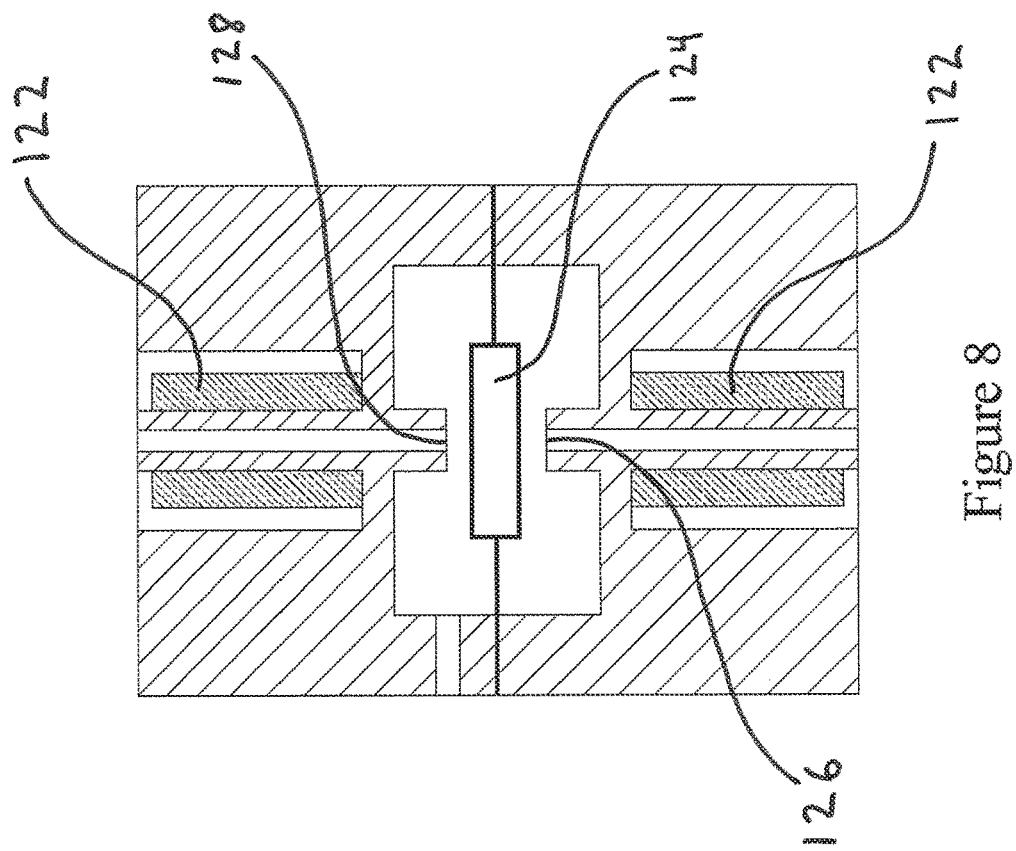
FIG. 8 is a cross-sectional view of one embodiment of a valve apparatus and system including stacked electromagnetic coil geometry rather than flat, circuit-board based electromagnetic coil geometry.

Referring now also to FIG. 8, a cross-sectional view showing another embodiment of the shuttle 124 is shown. In this embodiment, the shuttle 124 is actuated to seal either a first pressure orifice 126 or a second pressure orifice 128 through the use of traditional wound-coil electromagnets 122 instead of flat circuit board-based electromagnetic coils 34.

Referring now also to FIG. 9A an embodiment of a valve system/manifold is shown. In some embodiments, the valve manifold 130 may include an interior valve cavity 131, a first pressure source 132, a second pressure source 134, a cantilever armature 146 constructed of a ferrous or magnetic material, at least two electromagnetic coils 144, and a common output orifice 148. In some embodiments, the first pressure source 132 may include a first pressure post 136, which, in various embodiments, may be constructed of a ferrous material, and extends into the interior valve cavity 131, the interior edge of the first pressure post 136 defining a first pressure orifice 140. In various embodiments, the first pressure post 136 may be hollow such that the first pressure source 132 is in fluid communication with the interior valve cavity 131 by way of the first pressure orifice 140. In various embodiments, the second pressure source 134 may include a second pressure post 138, which, in some embodiments, may be constructed of a ferrous material, and extends into the interior valve cavity 131 substantially opposite of the first pressure post 136, the interior edge of the second pressure post 138 defining a second pressure orifice 142. In various embodiments, the second pressure post 138 may be hollow such that the second pressure source 134 is in fluid communication with the interior valve cavity 131 by way of the second pressure orifice 142. In various embodiments, the cantilever armature 146 may extend into the interior valve cavity 131 such that it is disposed between the first pressure orifice 140 and the second pressure orifice 142.

In various embodiments, a first electromagnetic coil 144 may be disposed around the first pressure post 136 such that, when the coil 144 has a current passed through it, the coil 144 energizes the first pressure post 136 which exerts an attractive force on the cantilever armature 146. A second electromagnetic coil 144 may be disposed around the second pressure post 138 such that, when the coil 144 has a current passed through it, the coil energizes the second pressure post 138 which exerts an attractive force on the cantilever armature 146.

In various embodiments, the cantilever armature 146 may be either sealed against the first pressure orifice 140 in a first position, or, alternatively, the armature 146 is sealed against the second pressure orifice 142 in a second position. In each sealing position, the armature 146 is held in place by a continuous magnetic attraction from the armature 146 to either the energized first pressure post 136 or the energized second pressure post 138, respectively, such that the fluid communication between the interior valve cavity 131 and the corresponding first pressure orifice 140 or the second pressure orifice 142 is eliminated. To switch the armature 146 from sealing against the first pressure orifice 140 to sealing against the second pressure orifice 142, the electromagnetic coil 144 disposed around the first pressure post 136 ceases to be energized and the electromagnetic coil 144 disposed around the second pressure post 138 is energized such that it supplies a magnetic charge to the second pressure post 138 sufficient to attract the armature 146 to sealing against the second pressure orifice 142. Similarly, to switch the armature 146 from sealing against the second pressure orifice 142 to sealing against the first pressure orifice 140, the electromagnetic coil 144 disposed around the second pressure post 138 ceases to be energized and the electromagnetic coil 144 disposed around the first pressure post 136 is energized such that it supplies a magnetic charge to the first pressure post 136 sufficient to attract the armature 146 to sealing against the first pressure orifice 140.

Referring now also to FIG. 9B, another embodiments of the valve system/manifold is shown. In this embodiment, the embodiment shown in FIG. 9A further comprises a magnet 150 disposed on the cantilever armature 146 with the magnetic force vector 155 substantially aligned with an axis 152 defined by the first pressure post 136 and the second pressure post 138. In some embodiments, the valve system shown in FIG. 9B may function as a bistable valve wherein the electromagnetic coils do not need to continuously energize the pressure post having the currently-sealed pressure orifice. The armature 146 is held against the sealed orifice through a static magnetic attraction.

Referring now also to FIG. 9C another embodiments of the valve system/manifold is shown. In this embodiment, the embodiment shown in FIG. 9A further includes a magnet 154 disposed on the cantilever armature 146 with the magnetic force vector 156 substantially perpendicular to the axis 152. Similar to the embodiment shown in FIG. 9B, the embodiment in FIG. 9C may also function as a bistable valve.

In various embodiments, the valve may be actuated by way of running a current through an electromagnetic coil, whose subsequent magnetic flux acts on a ferro fluid.

In various embodiments, the bistable valve may be actuated by a plurality of arrays in which a first array comprises a row of alternating polarity magnets, disposed adjacent to a second array comprising a row of alternating ferrous and non-ferrous material such that in one stable position, the ferrous material allows conductance of one polarity of the magnets, and in a second stable position, the arrays have shifted so the ferrous material allows conductance of the opposite polarity of the magnets. Depending on the magnetic polarity being conducted by the ferrous material, an adjacent ferrous or magnetic body is either pushed towards or pulled away from the plurality of arrays. It is this action on the ferrous body that causes a first stable position in the valve to occur or a second stable position in the valve to occur. By suspending the ferrous or magnetic body in an over molded elastomer, a seal against one or more orifices can be obtained in either position to allow each of the bistable valve's positions to occur. The shifting of the arrays may be caused by running a current through a plurality of piezoelectric crystals attached to each array. In some embodiments, the arrays may be shifted by other means/mechanisms/devices such as, but not limited to, one or more of the following: servos, motors, solenoids, hydraulic means, pneumatic means, and/or NITINOL wire.

In some embodiments, the action of the above magnetic body being pushed or pulled away may be used to compress fluid in a closed system against a thin membrane that will then deform into a bubble geometry. In various embodiments, this action may be used to actuate a valve by sealing the deformed membrane against an orifice in one position and allowing fluid communication through the orifice in another, non-deformed geometry.

In various embodiments, the valve may be actuated using an electroactive polymer. When the electroactive polymer is energized by sending current through it, the polymer may expand in one direction while compressing in another direction and allowing an attached seal to separate from a valve orifice. This separation allows fluid communication through the valve from that orifice. Stopping the current from running through the electroactive polymer allows the electroactive polymer to return to its original shape, expanding in the direction in which it previously compressed, and causing the attached seal to return to the valve orifice, stopping fluid communication from that orifice. Energizing the electroactive polymer may be accomplished by over molding electrodes in contact with the electroactive polymer. In various embodiments, energizing the electroactive polymer may occur through the use of etched or printed electrodes in a flat orientation being directly attached to the electroactive polymer. Multiple layers of these electrodes may be utilized to achieve optimal control of the electroactive polymer.

Figure 10B:
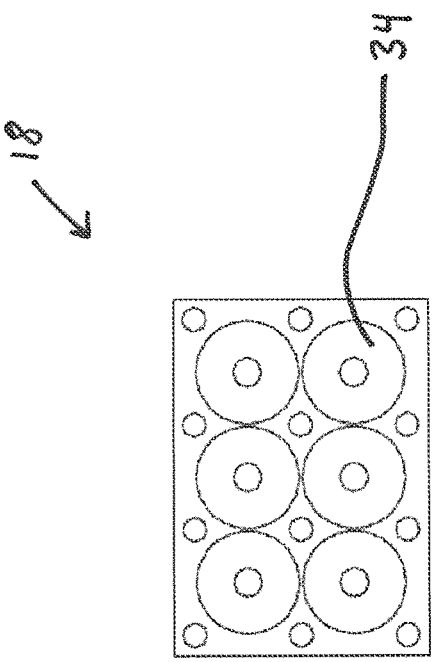
FIG. 10B is a top view of a circuit board having multiple flat electromagnetic coils according to one embodiment.
Figure 10A:
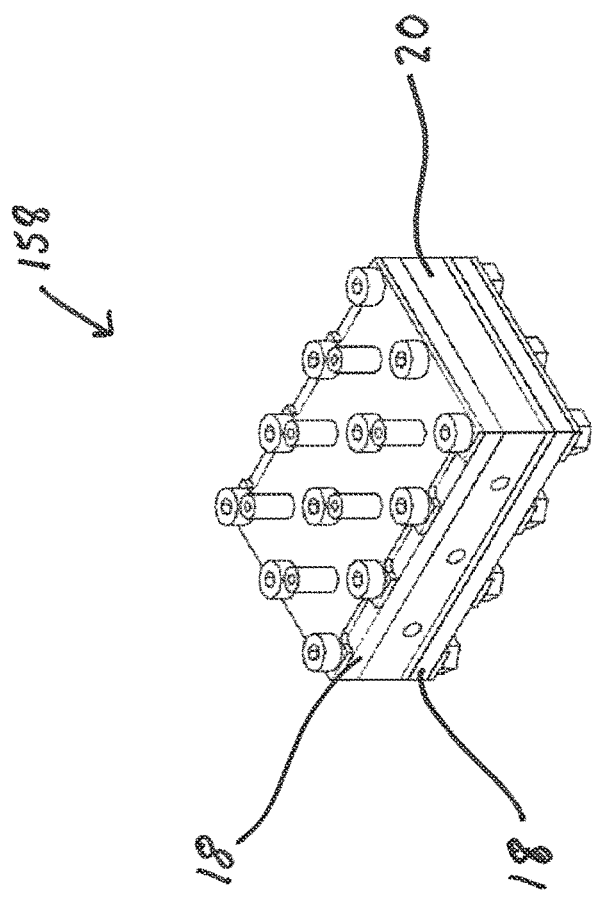
FIG. 10A is a perspective view of one embodiment of a valve apparatus and system arranged in an array geometry.
Figure 10C:
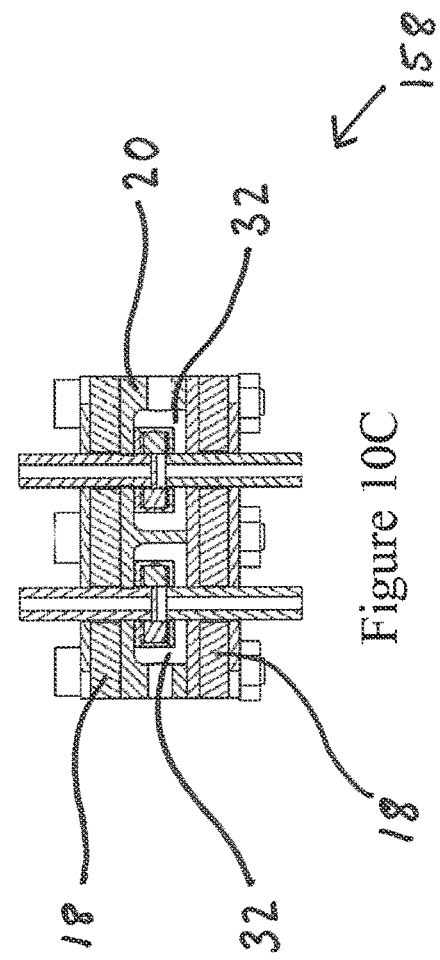
FIG. 10C is a cross-sectional view of one embodiment of a valve apparatus and system arranged in an array geometry.

Referring now also to FIG. 10A, a perspective view of a plurality of bistable valves 10 according to one embodiment are arranged in an array 158 wherein the valve manifold 20 is a common part among multiple bistable valves 10. Referring now also to FIG. 10B, a top view of a circuit board 18 comprising multiple electromagnetic coils 34 for use in one embodiments of bistable valves arranged in an array 158 as shown in FIG. 10A. Referring now also to FIG. 10C, is a cross-sectional view showing a plurality of one embodiments of bistable valves 10 arranged in a valve array 158 and utilizing a common valve manifold 20, wherein the valve manifold 20 comprises multiple interior valve cavities 32, is shown.

In various embodiments, the electromagnetic coils 34 may be disposed in a flexible circuit board instead of a rigid circuit board.

In various embodiments of the various embodiments of the valve arrays may include two or more bistable valves.

Figure 11A:
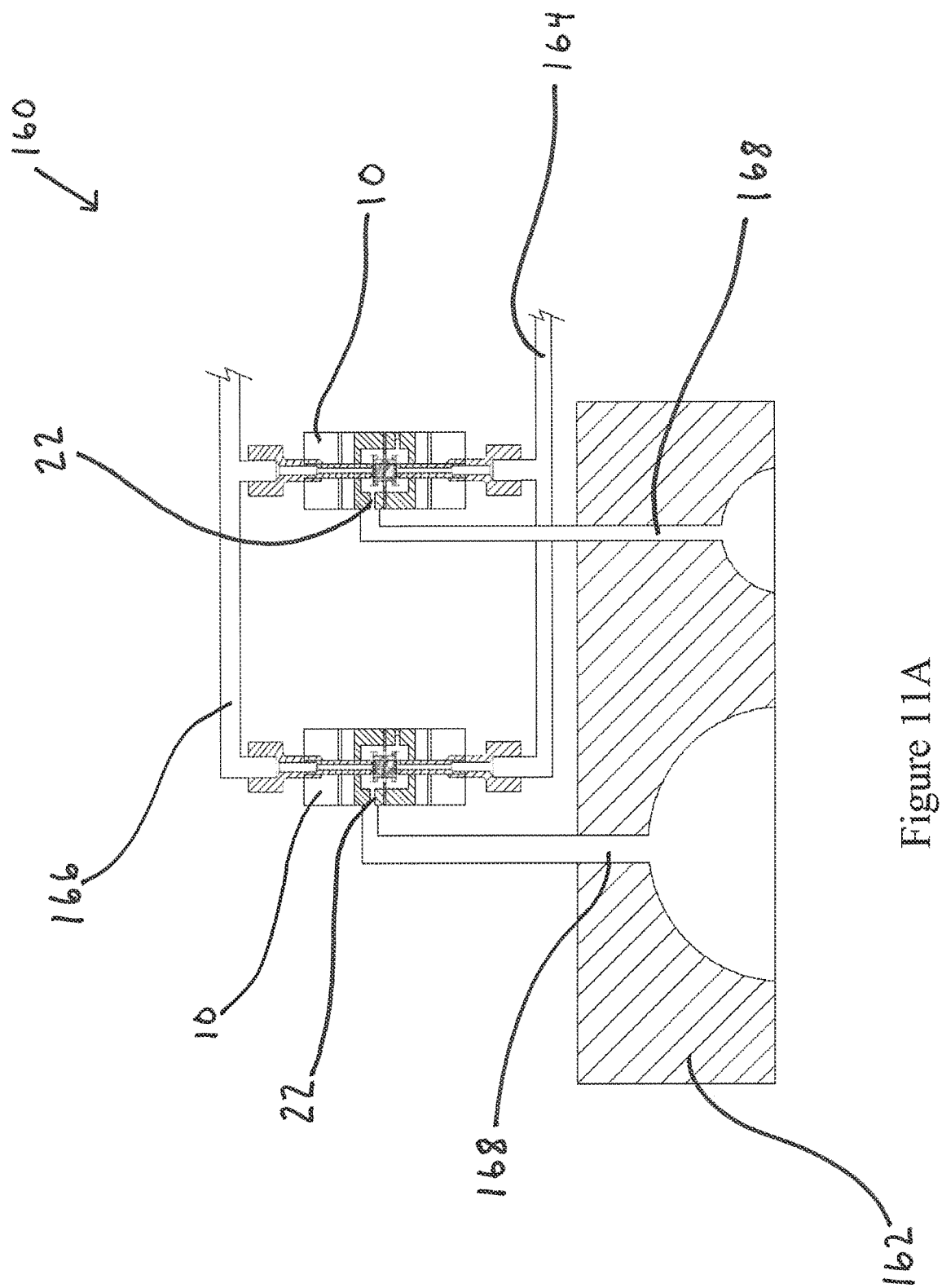
FIG. 11A is a cross-sectional view of one embodiment of a valve apparatus and system integrated into a system.

Referring now also to FIG. 11A, in some embodiments, at least one bistable valve 10 may be integrated into a system 160. The bistable valve 10 may be affixed to a system manifold 162 in a vertical orientation such that the common output orifice 22 is in fluid communication with the system's pressure input 168. In various embodiments, the valve system 160 further includes a first pressure source 164 and a second pressure source 166 for use in the bistable valve 10, for example, as shown in FIGS. 1A-1D. The first pressure source 164 and the second pressure source 166 may be integrated into the system manifold 162 or, in another embodiment, may be standalone components in the system 160. In yet another embodiment, either the first pressure source 164, the second pressure source 166, or both may be a common source to all or multiple bistable valves 10 integrated into the system manifold 162.

Figure 11B:
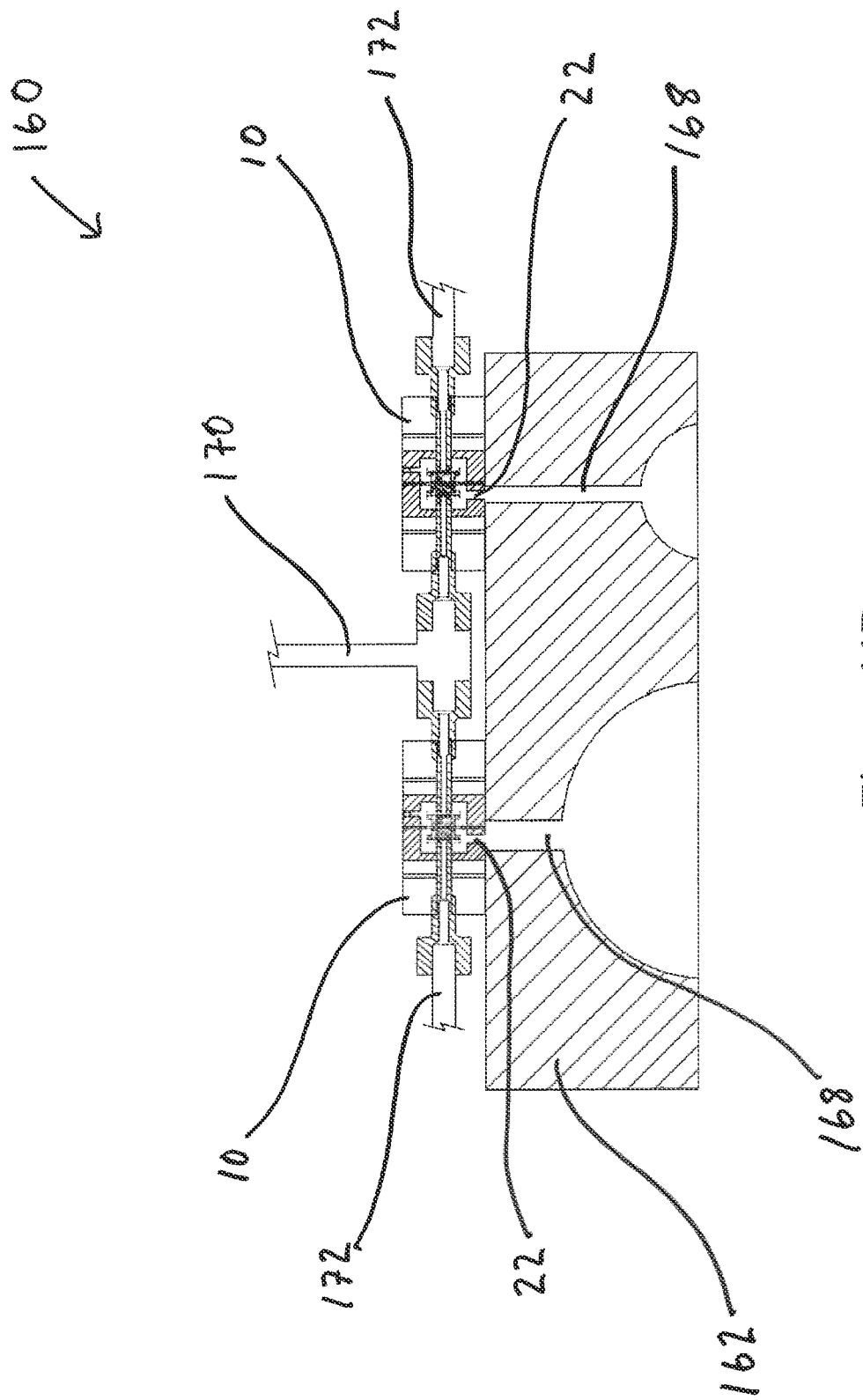
FIG. 11B is a cross-sectional view of one embodiment of a valve apparatus and system integrated into a system.

Referring now also to FIG. 11B, in some embodiments, at least one bistable valve 10 may be integrated into a system 160 and in various embodiments of the system 160, two or more bistable valves 10 may be integrated into a system 160. In this embodiment, the bistable valve 10 may be disposed in a horizontal orientation and directly affixed to the system manifold 162 such that the common output orifice 22 is in direct fluid communication with the system's pressure input 168. The system 160 may further includes a first pressure source 170 and a second pressure source 172 for use in the bistable valve 10 as shown in FIGS. 1A-1D. The first pressure source 170 and the second pressure source 172 may be integrated into the system manifold 162 or, in some embodiments, may be standalone components in the system 160. In some embodiments, either the first pressure source 170, the second pressure source 172, or both may be a common source to all or multiple bistable valves 10 integrated into the system 160.

Figure 12A:
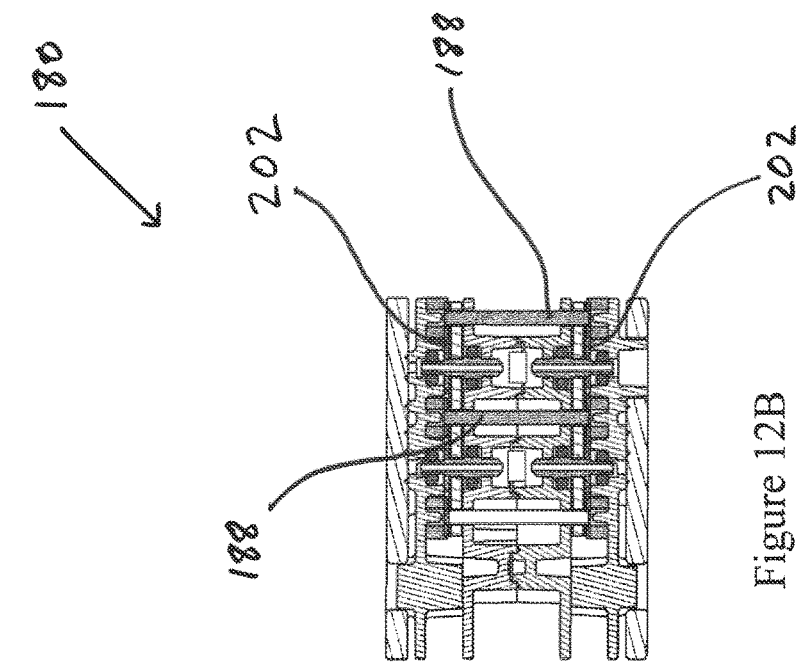
FIG. 12A is a cross-sectional view of one embodiment of a valve apparatus and system arranged in an array geometry.
Figure 12B:
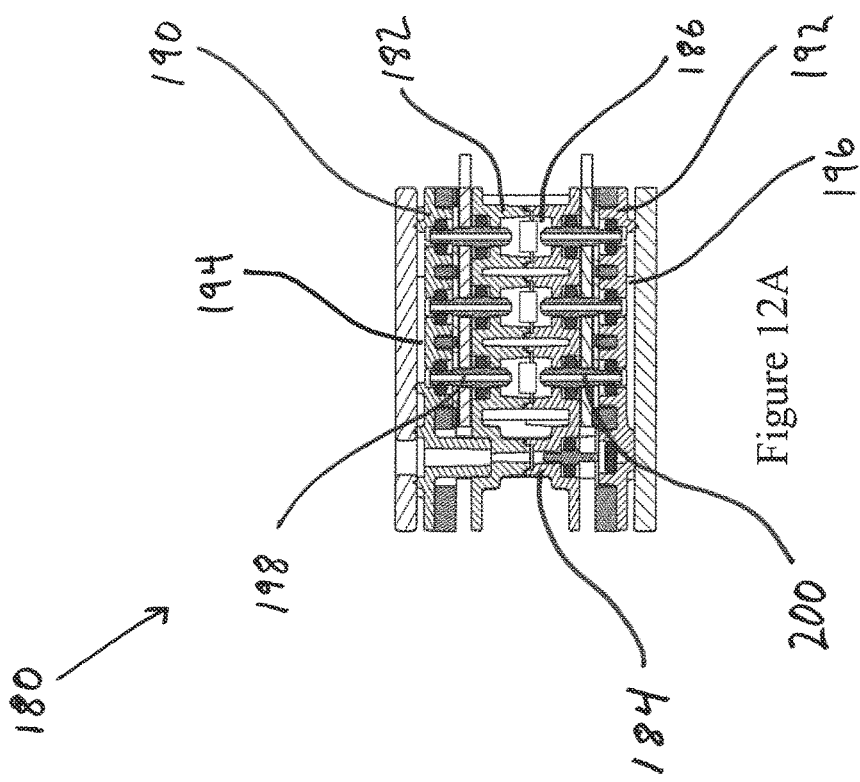
FIG. 12B is a cross-sectional view of one embodiment of a valve apparatus and system arranged in an array geometry showing fasteners in the assembly.

Referring now to FIGS. 12A and 12B, in some embodiments, a plurality of bistable valves 10 may be arranged in an array 180. This array 180 may utilize common components between the multiple bistable valves 10, such as a valve manifold comprising an upper manifold half 182 and a lower manifold half 184. The upper and lower manifold halves may define multiple interior valve cavities 186, each interior valve cavity 186 corresponding to one bistable valve assembly. Other common components may include an upper half track 190 including an upper half track pressure rail 194 and a lower half track 192 including a lower half track pressure rail 196. The upper half track pressure rail 194 may provide the same pressure input to each of the upper pressure input posts 198, wherein each upper pressure input post 198 corresponds to one of the plurality of bistable valves in the array 180. Similarly, the lower half track pressure rail 196 may provide the same pressure input to each of the lower pressure input posts 200, wherein each lower pressure input post 200 corresponds to one of the plurality of bistable valves 10 in the array 180. As seen in FIG. 12B, in various embodiments, adjacent bistable valves may further share common fasteners 188 constructed of a ferrous material which are integral to the magnetic return path in the function of each bistable valve 10 in the array 180.

In various embodiments, the upper manifold half 182 and lower manifold half 184 of the current embodiment may be ultrasonically welded together to create an airtight union between the two. Similarly, each of the upper half track 190 and the lower half track 192 may be ultrasonically welded together to create an airtight union around the respective upper half track pressure rail 194 and lower half track pressure rail 196. The valve manifold and each of the upper half track 190 and lower half track 192 components may then be assembled to each other using laser welding.

As seen in FIG. 12B, some embodiments may include an outer plate 202 constructed of a ferrous material. The upper and lower outer plates 202 may be connected by a plurality of common fasteners 188 also constructed of a ferrous material.

Figure 13:
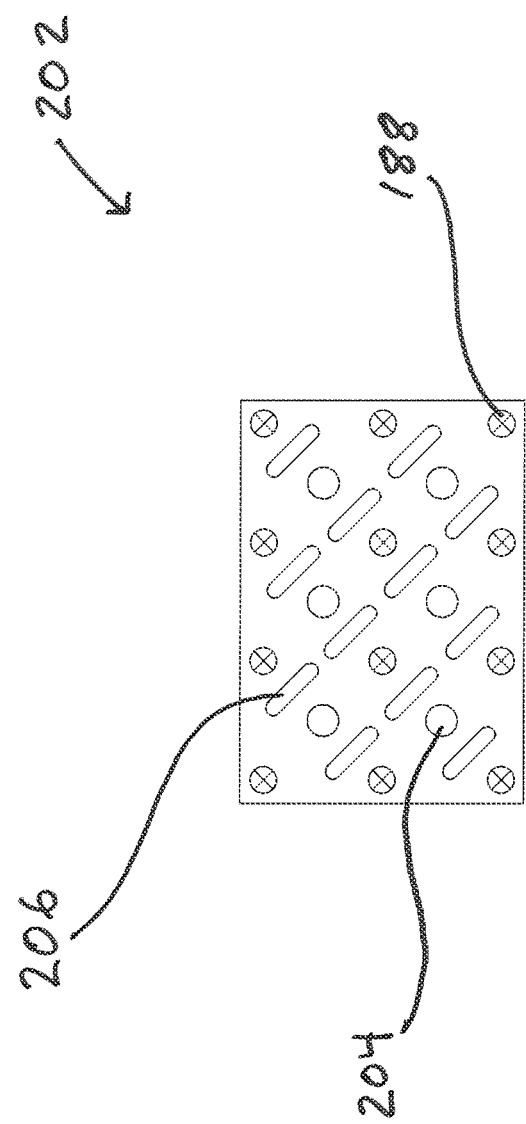
FIG. 13 is a top view of an outer plate for use in the array geometry embodiment.

Referring now also to FIG. 13, in some embodiments, an outer plate 202 may be employed by an array 180 of bistable valves. In various embodiments, a plurality of fasteners 188 surrounds the pressure posts 204 of each valve in the array. Additionally, in various embodiments, each outer plate may further include a plurality of directional slits 206. The directional slits 206 may be arranged such that the magnetic flux paths of two adjacent valves are directed towards different fasteners 188 to aid in each valve's function when both are actuated simultaneously. In various embodiments, staggering adjacent valves' actuation times may be used to optimize the valves' magnetic flux path flow.

Figure 14A:
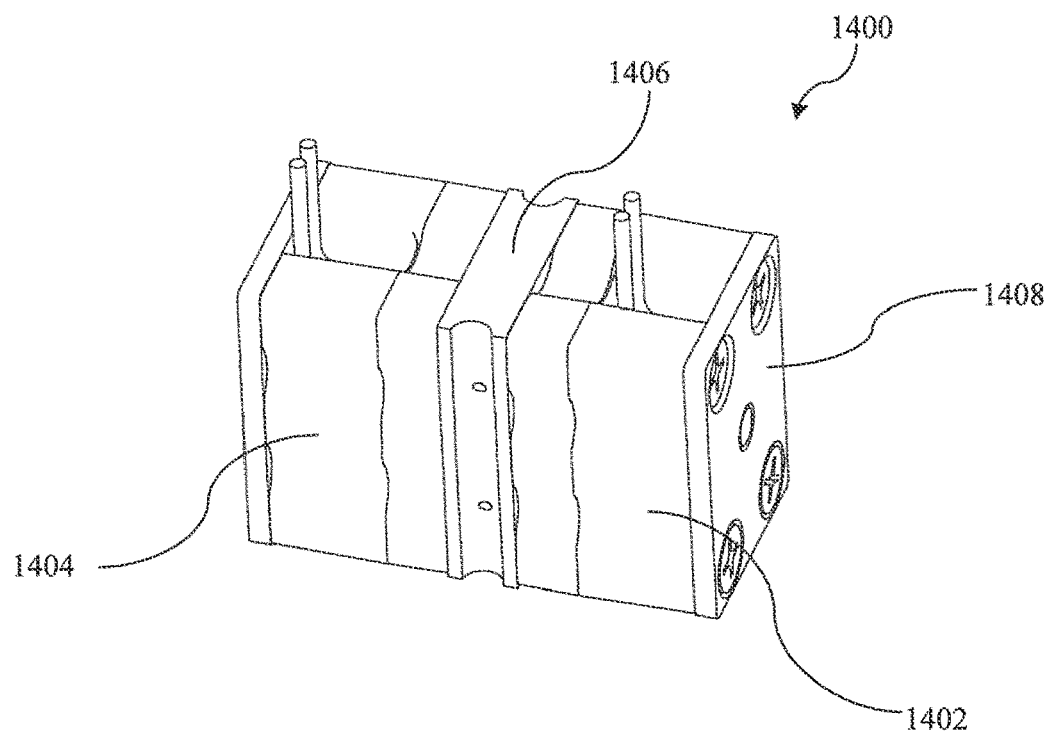
FIGS. 14A-14C are various views of one embodiment of a valve apparatus.
Figure 14B:
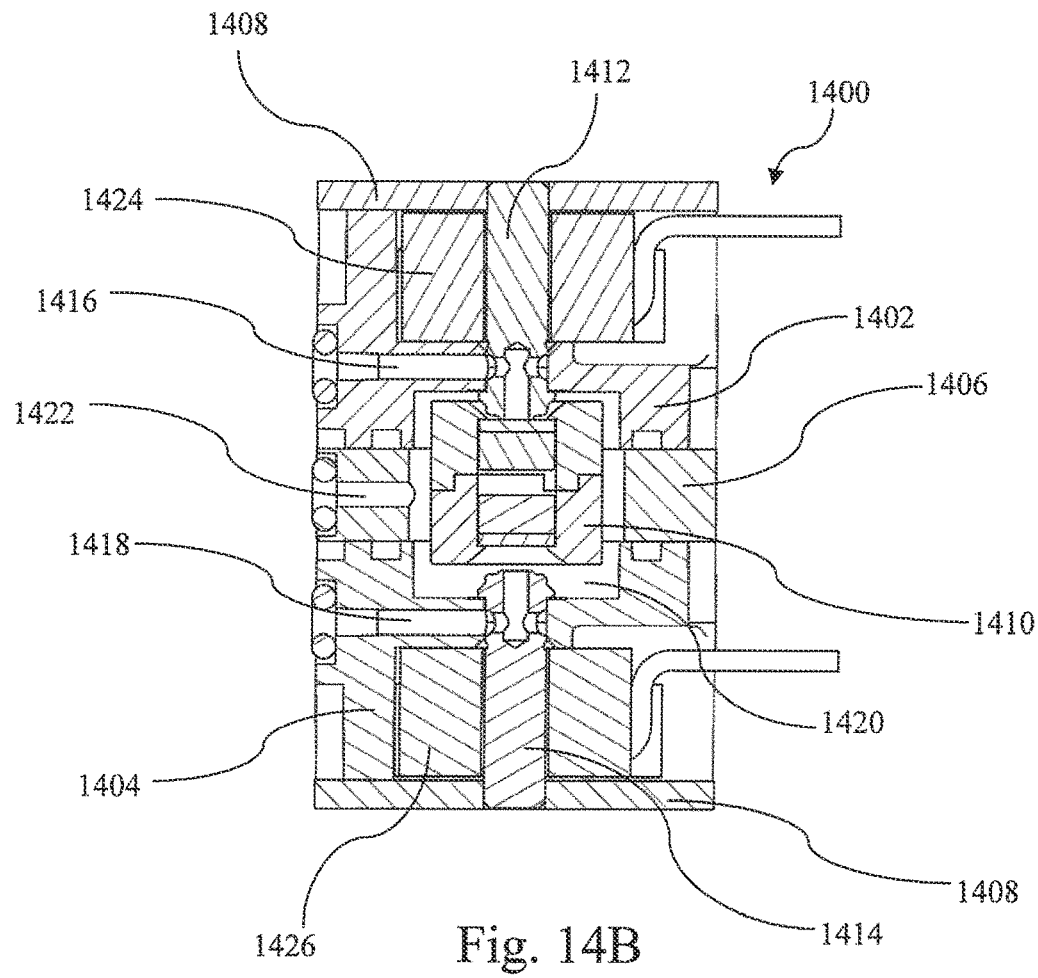
Figure 14C:
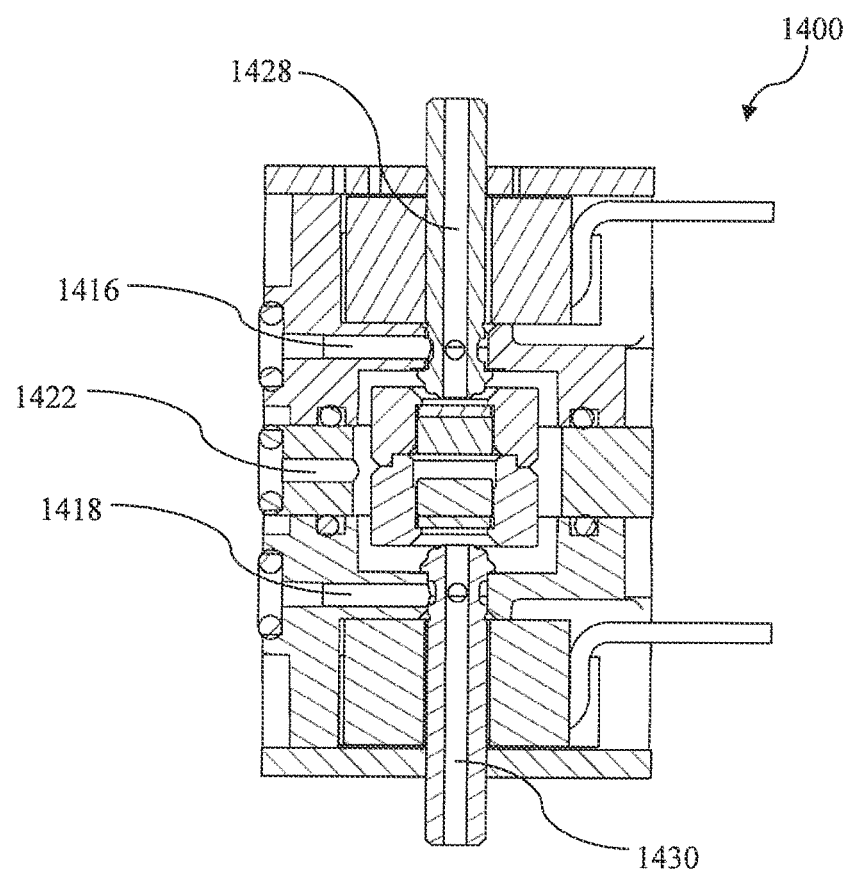

Referring now also to FIGS. 14A-14C, another embodiment of a bistable valve structure is shown. The valve 1400 includes an interior valve cavity 1420 defined by a first housing 1402, a second housing 1404, and a midbody 1406. Additionally, the valve 1400 includes a plurality of end plates 1408, a shuttle 1410, a first post 1412, a second post 1414, first pressure inlet 1416, a second pressure inlet 1418, and a common output orifice 1422. Further, the bistable valve 1400 includes a first electromagnetic coil 1424 and a second electromagnetic coil 1426 disposed around the first and second posts 1412 and 1414, respectively. In various embodiments, the electromagnetic coils 1424 and 1426 may be flat electromagnetic coils disposed in a printed circuit board (PCB), or they may be vertically-oriented wire electromagnetic coils with wire leads as shown in FIG. 14B. The common output orifice 1422 may be in constant fluid communication with the valve cavity, regardless of which position the valve is in. Conversely, the first and second pressure inlets 1416 and 1418 are either in fluid communication with the interior valve cavity 1420, and thus, the common output orifice 1422, or they are sealed from fluid communication with the interior valve cavity by the shuttle 1410. When one of the two pressure inlets 1416 and 1418 is in fluid communication with the interior valve cavity, the other pressure inlet is sealed by the shuttle.

The first pressure inlet 1416 and the second pressure inlet 1418 may, in some embodiments, extend through the same side of the valve 1400 as the common output orifice 1422, as shown in FIG. 14B. Moreover, the first and second posts 1412 and 1414 may each have an additional pressure inlet 1428 and 1430, respectively, as shown in FIG. 14C. The third pressure inlet 1428 may be in constant fluid communication with the first pressure inlet 1416, while the fourth pressure inlet may be in constant fluid communication with the second pressure inlet 1418. In some embodiments, the valve 1400 may feature a third pressure inlet 1428 and a fourth pressure inlet 1430, each extending through their respective first and second posts, without the additional first and second pressure inlets 1416 and 1418.

Figure 15A:
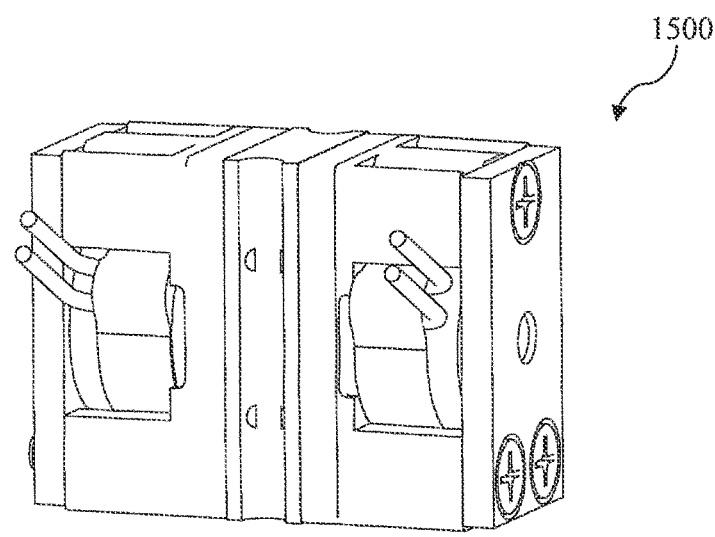
FIGS. 15A-15B are various views of one embodiment of a valve apparatus.
Figure 15B:
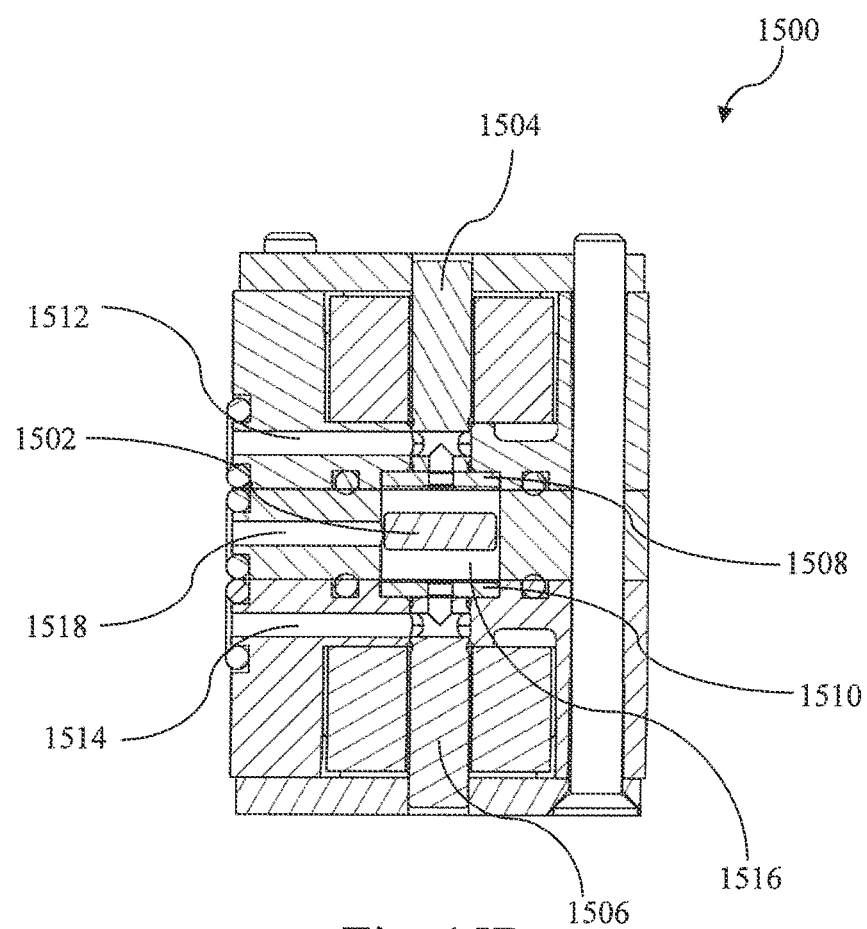

Referring now also to FIGS. 15A-15B, in some embodiments, a bistable valve 1500 may include a shuttle 1502 comprising a magnet. The valve 1500 may further include a first membrane portion 1508 fixedly abutting a first post 1504, and a second membrane portion 1510 fixedly abutting a second post 1506, the first and second membrane portions 1508 and 1510, as well as the shuttle 1502 being disposed in an interior valve cavity 1516. The first post 1504 and the first membrane portion 1508 may be configured to provide fluid communication from a first pressure inlet 1512 to the interior valve cavity 1516 when the shuttle 1502 is not sealed against the first membrane portion 1508. Similarly, the second post 1506 and the second membrane portion 1510 may be configured to provide fluid communication from a second pressure inlet 1514 to the interior valve cavity 1516 when the shuttle 1502 is not sealed against the second membrane portion 1510. A common output orifice 1518 is in constant fluid communication with the interior valve cavity 1516, regardless of which position the shuttle 1502 is in. Conversely, the first and second pressure inlets 1512 and 1514 are either in fluid communication with the interior valve cavity 1516, and thus, the common output orifice 1518, or they are sealed from fluid communication with the interior valve cavity by the shuttle 1502. When one of the two pressure inlets 1512, 1514 is in fluid communication with the interior valve cavity 1518, the other pressure inlet is sealed by the shuttle 1502.

Figure 16A:
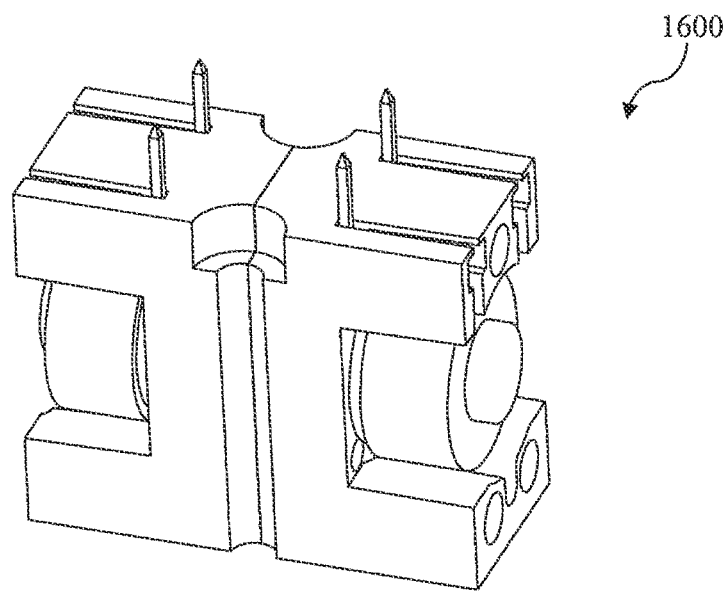
FIGS. 16A-16B are various views of one embodiment of a valve apparatus.
Figure 16B:
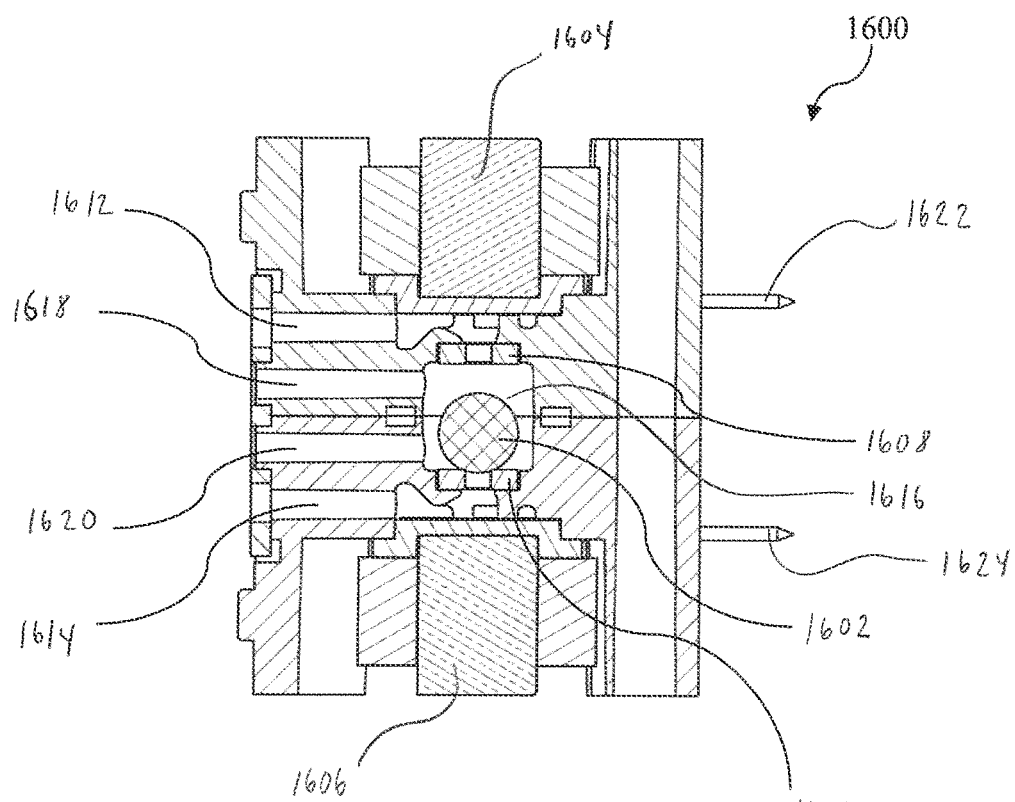

Referring now also to FIGS. 16A-16B, in some embodiments, a bistable valve 1600 may include a shuttle 1602 comprising ferrous metal. The first post 1604 and the second post 1606 are each magnets. The valve 1600 may further include a first membrane portion 1608 fixedly abutting a first post 1604, and a second membrane portion 1610 fixedly abutting a second post 1606, the first and second membrane portions 1608 and 1610, as well as the shuttle 1602 being disposed in an interior valve cavity 1616. The first post 1604 and the first membrane portion 1608 may be configured to provide fluid communication from a first pressure inlet 1612 to the interior valve cavity 1616 when the shuttle 1602 is not sealed against the first membrane portion 1608. Similarly, the second post 1606 and the second membrane portion 1610 may be configured to provide fluid communication from a second pressure inlet 1614 to the interior valve cavity 1616 when the shuttle 1602 is not sealed against the second membrane portion 1610. Output orifices 1618, 1620 are in constant fluid communication with the interior valve cavity 1616, regardless of which position the shuttle 1602 is in. Conversely, the first and second pressure inlets 1612 and 1614 are either in fluid communication with the interior valve cavity 1616, and thus, the output orifices 1618, 1620 or they are sealed from fluid communication with the interior valve cavity by the shuttle 1602. When one of the two pressure inlets 1612, 1614 is in fluid communication with the interior valve cavity 1618, the other pressure inlet is sealed by the shuttle 1602. In various embodiments, as shown in FIG. 16B, the shuttle 1602 may be spherical and may be made from any material as described above with respect to various embodiments of the shuttle. In various embodiments, the bistable valve 1600 may include contact terminals 1622, 1624.

Referring now also to FIGS. 17A-17E, in some embodiments, a bistable valve 1700 may include a shuttle 1702 comprising a magnet portion 1724. The shuttle 1702 may further include a first membrane portion 1708 which will abut a first post 1704, and a second membrane portion 1710 which will abut a second post 1706, the first and second membrane portions 1708 and 1710 attached to the magnet portion 1724, and the shuttle 1702 is disposed in an interior valve cavity 1716. The first and second membrane portions 1708, 1710 may be attached to the magnet portion 1724 using any type of adhesive, including, but not limited to, double sized tape and or glue. In various other embodiments, the first and second membrane portions may be attached using any method of attachment.

The first post 1704 and the first membrane portion 1708, which is attached to the magnet portion 1724, may be configured to provide fluid communication from a first pressure inlet 1712 to the interior valve cavity 1716 when the shuttle 1702 is not sealed against the first post 1704. Similarly, the second post 1706 and the second membrane portion 1710, which is attached to the magnet portion 1724, may be configured to provide fluid communication from a second pressure inlet 1714 to the interior valve cavity 1716 when the shuttle 1702 is not sealed against the second post 1706. Output orifices 1718, 1720 are in constant fluid communication with the interior valve cavity 1716, regardless of which position the shuttle 1702 is in. Conversely, the first and second pressure inlets 1712 and 1714 are either in fluid communication with the interior valve cavity 1716, and thus, the output orifices 1718, 1720 or they are sealed from fluid communication with the interior valve cavity by the shuttle 1702. When one of the two pressure inlets 1712, 1714 is in fluid communication with the interior valve cavity 1718, the other pressure inlet is sealed by the shuttle 1702. In various embodiments, the shuttle 1702 may be cylindrical and may be made from any material as described above with respect to various embodiments of the shuttle. In various embodiments, the bistable valve 1700 may include contact terminals 1722, 1724 as well as coils 1726, 1728 and end bodies 1730, 1732 and end plates 1734, 1736, attached to the end bodies 1730, 1732.

Figure 17A:
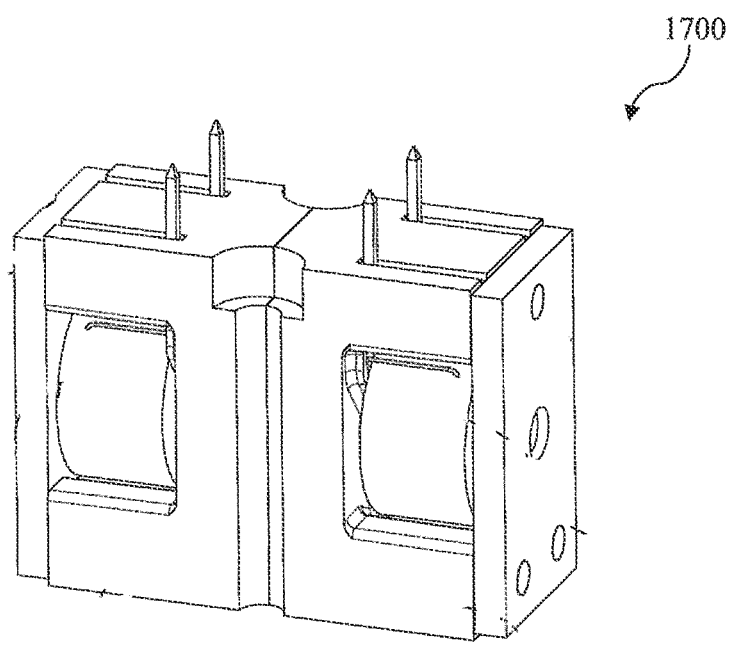
FIGS. 17A-17E are various views of one embodiment of a valve apparatus.
Figure 17B:
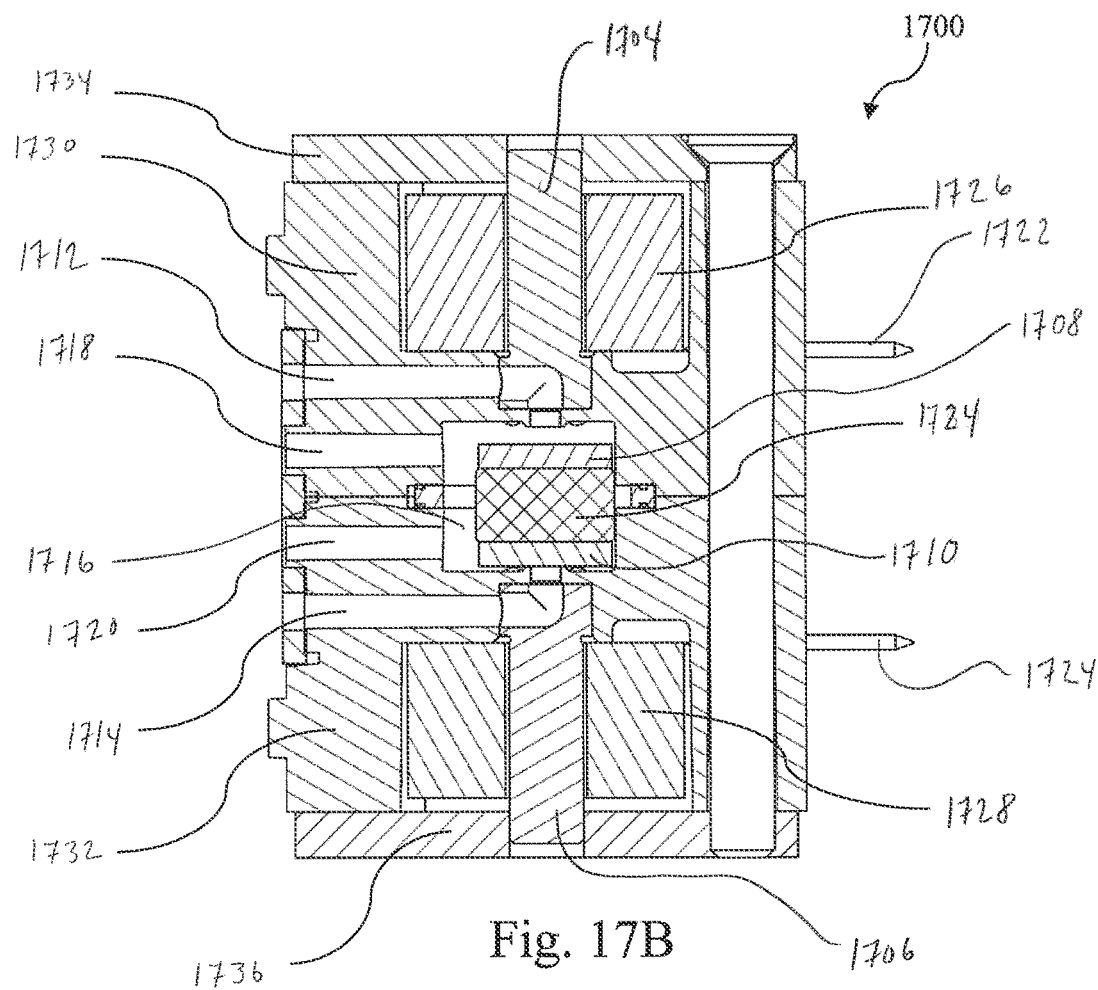
Figure 17C:
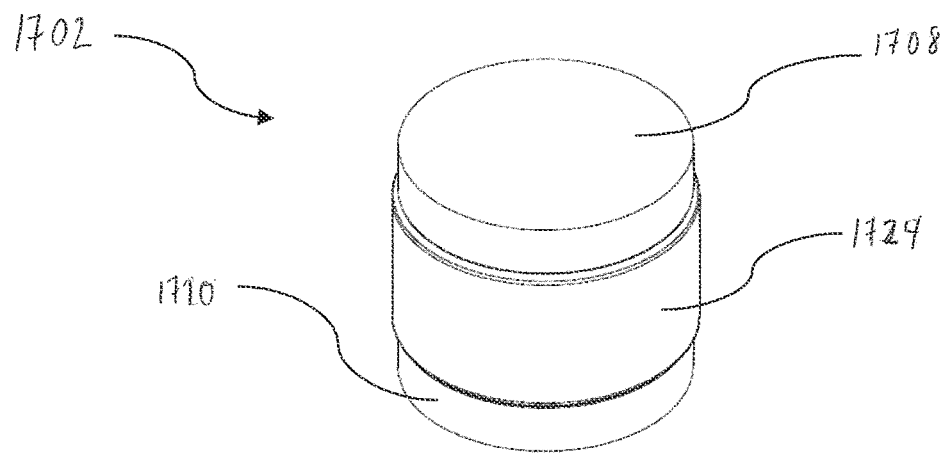
Figure 17D:
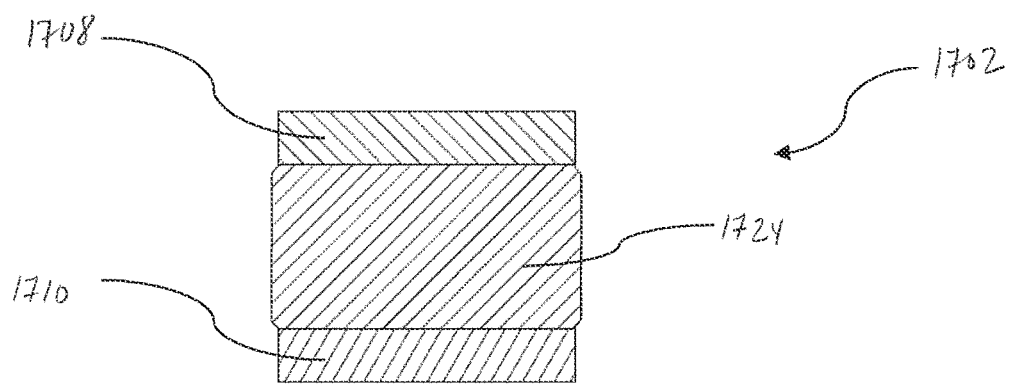
Figure 17E:
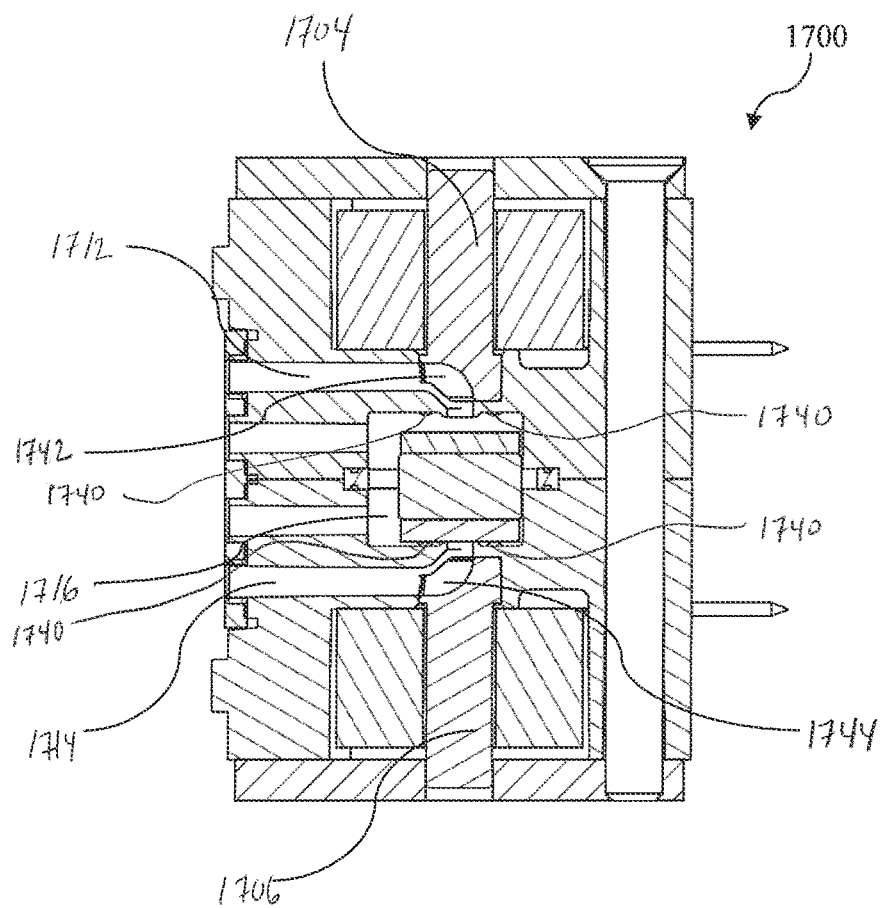

The first and second posts 1704, 1706 shown in FIGS. 17B and 17E include two different embodiments of creating the two pressure inlets. In FIG. 17B, the first and second posts 1704, 1706 include a hole machines in, whereas, in FIG. 17E, the first and second posts 1704, 1706 include a machine groove, which is a slot and/or curve cut 1742, 1744.

Figure 18A:
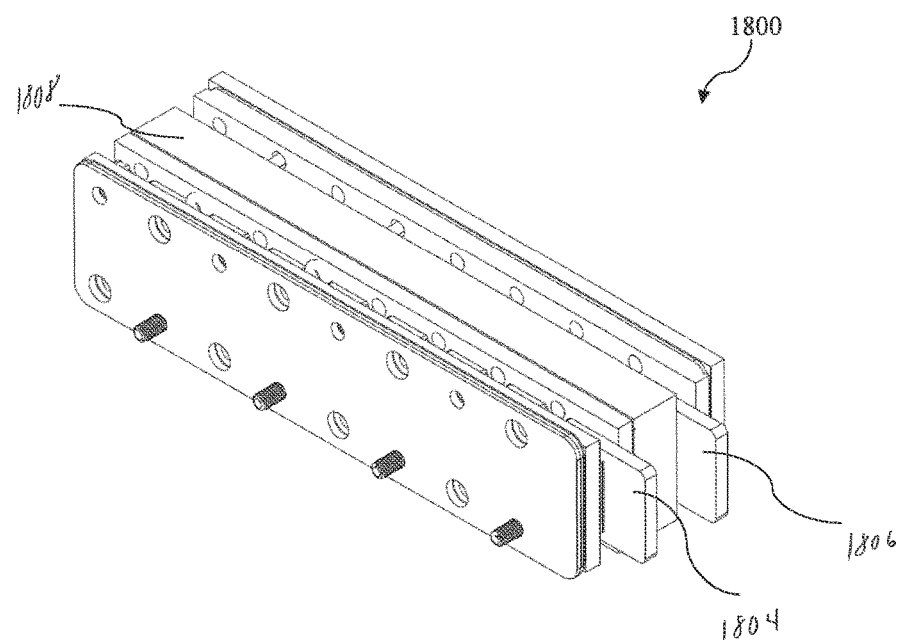
FIGS. 18A-18B are various views of one embodiment of a valve manifold.
Figure 18B:
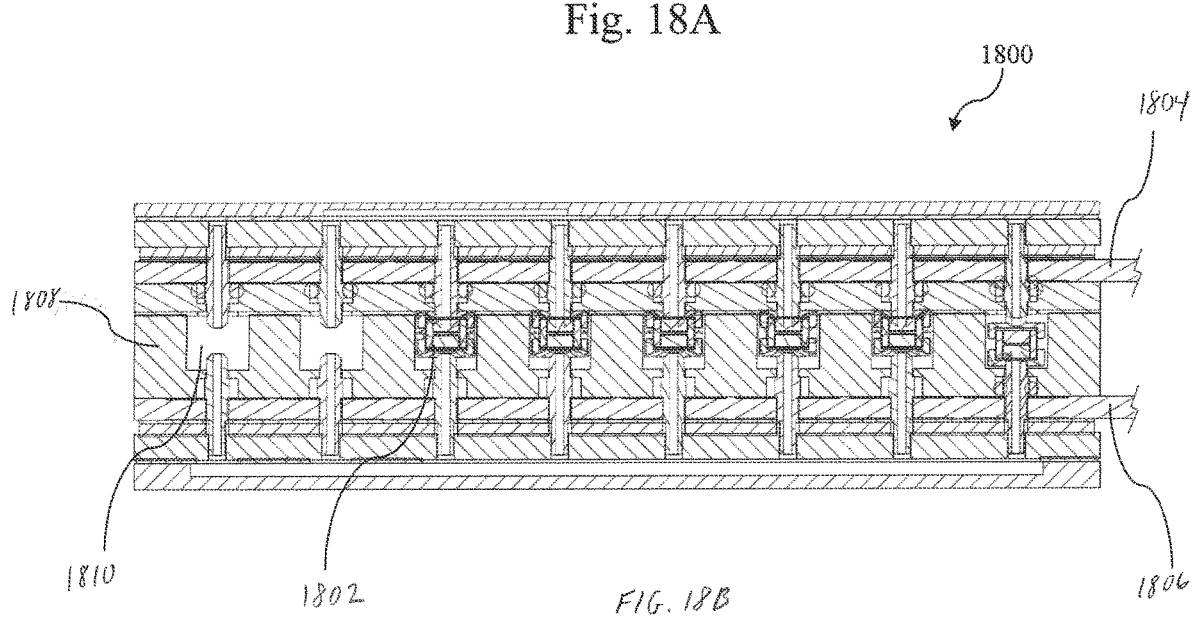

Referring now to FIGS. 18A-18B, in various embodiments, one or more of any of the various embodiments of the bistable valve may be combined into an array and/or a manifold with multiple bistable valves 1800. The array 1800 includes one or more bistable valves including a shuttle 1802, which may be any embodiment of the shuttle described herein. The manifold 1800 includes end plates 1804, 1806 and a coil assembly 1808, that houses the shuttle 1802 as well as various other elements including, but not limited to, the interior valve cavity 1810.

A bistable valve or valve system according to the various embodiments may be used in many different applications including, but not limited to, use in a blood pump, hemodialysis machine, seat cushion, peritoneal dialysis machine and/or other medical device. A bistable valve or valve system according to the various embodiments may also be used to inflate a seat cushion in a powered wheelchair or other device. A bistable valve or valve system according to the various embodiments may be used in any application requiring the employment of a traditional standalone pneumatic or electronically-actuated valve.

Further, the electromagnetic functionality described above may be applied to a monostable valve as well, where instead of the shuttle having a first and a second pressure position, the monostable valve has an on and an off position with one pressure source.

A number of embodiments have been described. Nevertheless, it will be understood that various modifications may be made. Accordingly, other embodiments are within the scope of the following claims.

Figure 19A:
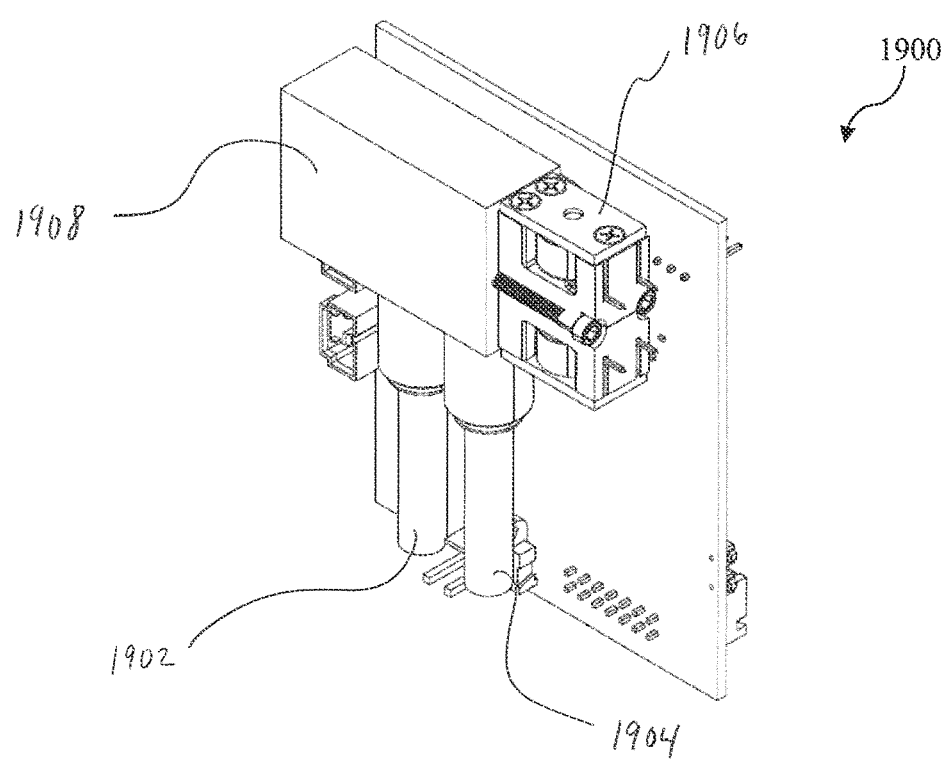
FIGS. 19A-19B are various views of one embodiment of a valve incorporated into a regulator.
Figure 19B:
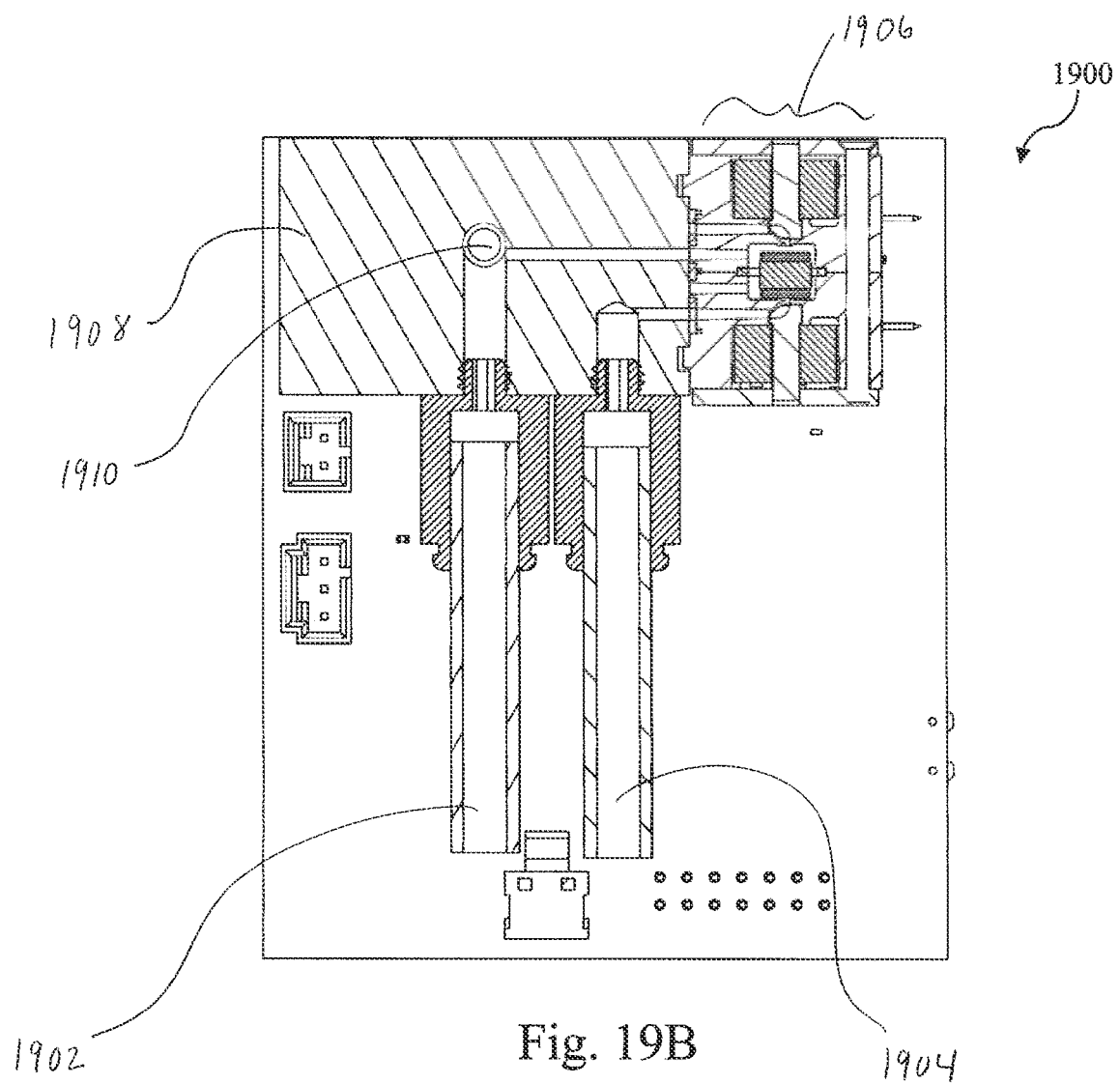

Referring now also to FIGS. 19A-19B, various embodiments of the bistable valve may be intergrated into various assemblies. An example is shown in FIGS. 19A-19B where an embodiment of the bistable valve 1906 is integrated into a regulator for a medical device, for example, a hemodialysis machine. The integration includes a regulator PCB 1900 that includes the bistable valve 1906, outlet tubing 1902, inlet tubing 1904, a pressure sensor 1910 and a PCB valve adapter block 1908. This is one embodiment of such an integration, however, one or more embodiments of the bistable valve may be incorporated into any device and/or used in conjunction with any device. In practice, one pressure inlet is blocked and the pressure is regulated using the inlet tubing 1904 and the outlet tubing 1902.

Figure 20A:
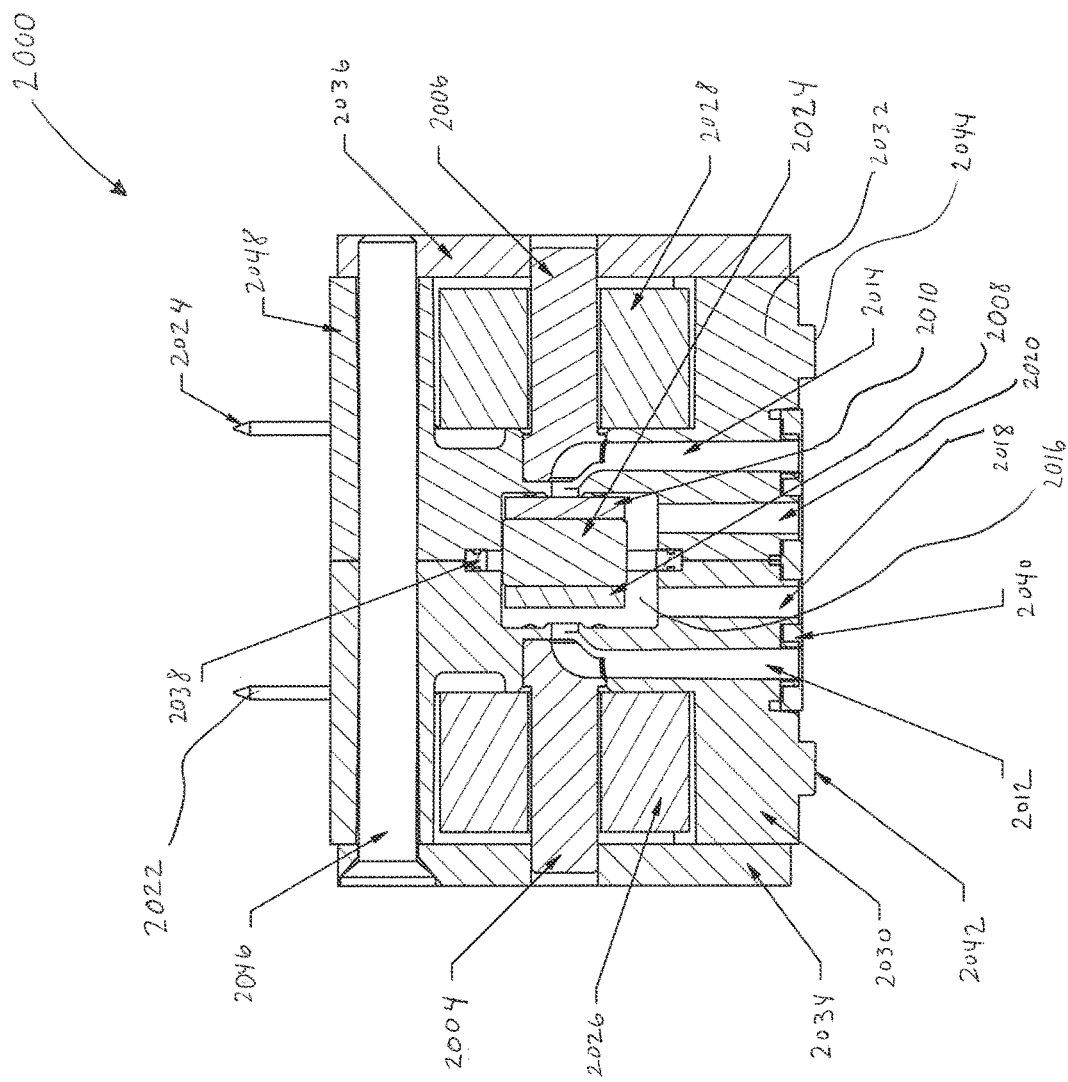
FIGS. 20A-20C are various views of one embodiment of a valve apparatus.
Figure 20B:
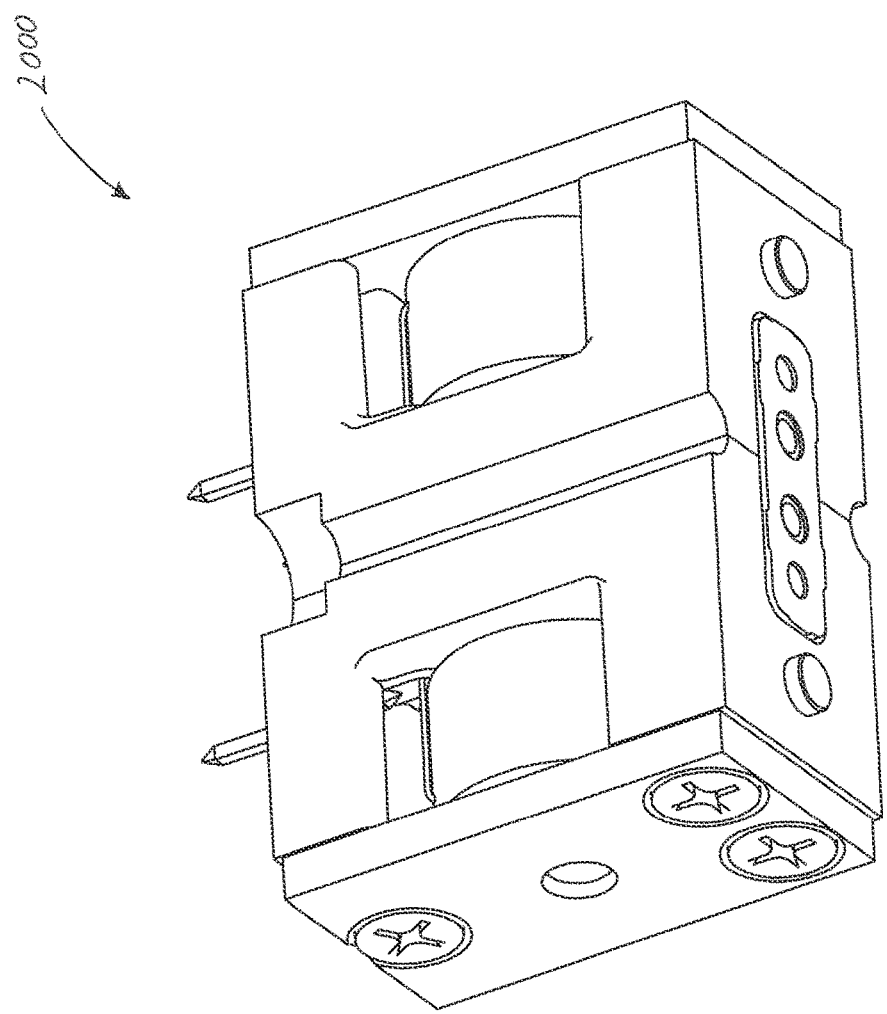
Figure 20C:
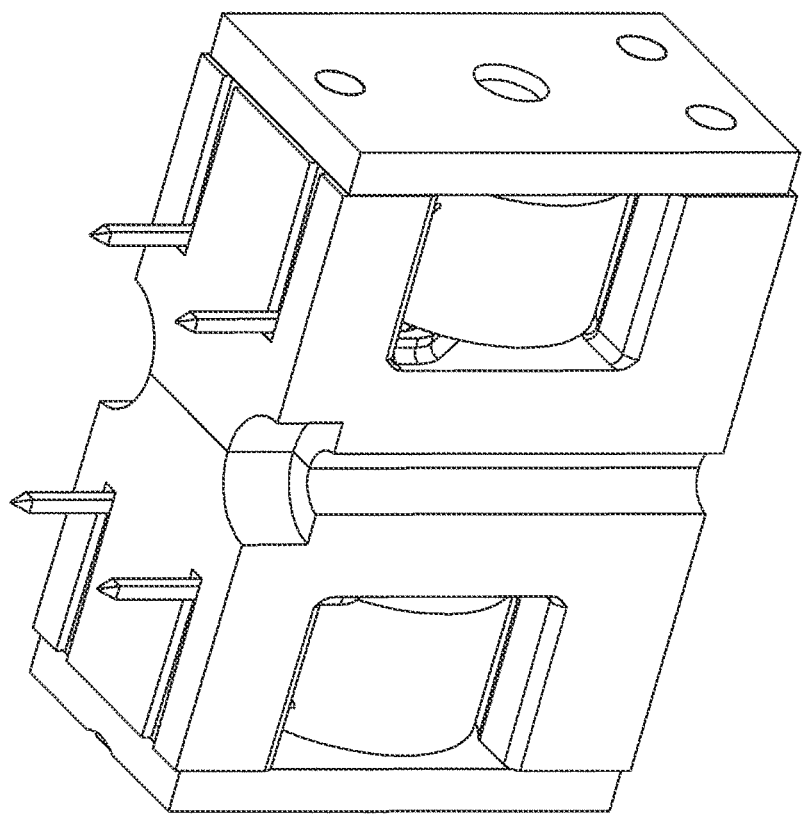

Referring now also to FIGS. 20A-20C, in some embodiments, a bistable valve 2000 may include a shuttle comprising a magnet portion 2024. The shuttle may further include a first membrane portion 2008 which will abut a first post 2004, and a second membrane portion 2010 which will abut a second post 2006, the first and second membrane portions 2008 and 2010 attached to the magnet portion 2024, and the shuttle is disposed in an interior valve cavity 2016. The first post 2004 and the first membrane portion 2008, which is attached to the magnet portion 2024, may be configured to provide fluid communication from a first pressure inlet 2012 to the interior valve cavity 2016 when the shuttle is not sealed against the first post 2004. Similarly, the second post 2006 and the second membrane portion 2010, which is attached to the magnet portion 2024, may be configured to provide fluid communication from a second pressure inlet 2014 to the interior valve cavity 2016 when the shuttle is not sealed against the second post 2006. Output orifices 2018, 2020 are in constant fluid communication with the interior valve cavity 2016, regardless of which position the shuttle is in. Conversely, the first and second pressure inlets 2012 and 2014 are either in fluid communication with the interior valve cavity 2016, and thus, the output orifices 2018, 2020 or they are sealed from fluid communication with the interior valve cavity by the shuttle. When one of the two pressure inlets 2012, 2014 is in fluid communication with the interior valve cavity 2016, the other pressure inlet is sealed by the shuttle. In various embodiments, the shuttle may be cylindrical and may be made from any material as described above with respect to various embodiments of the shuttle. In various embodiments, the bistable valve 2000 may include contact terminals 2022, 2024 as well as coils 2026, 2028 and end bodies 2030, 2032 and end plates 2034, 2036, attached to the end plates 2030, 2032. In various embodiments, the bistable valve 2000 may also include at least one gasket seal 2038 and at least one face seal 2040. In various embodiments, the seals may be any type of seal and in various embodiments, there may be more than one seal in the bistable valve 2000. In various embodiments, the bistable valve 2000 may also include locating pins 2042, 2044 as well as a tie bar/screw 2046 and an end body housing 2048. In some embodiments, the tie bar/screw 2046 attaches the end plates 2034, 2036 to the end body housing 2048, however, in various other embodiments, various methods of attachment may be used including adhesive, bolts, screws, pins, etc.

Figure 21A:
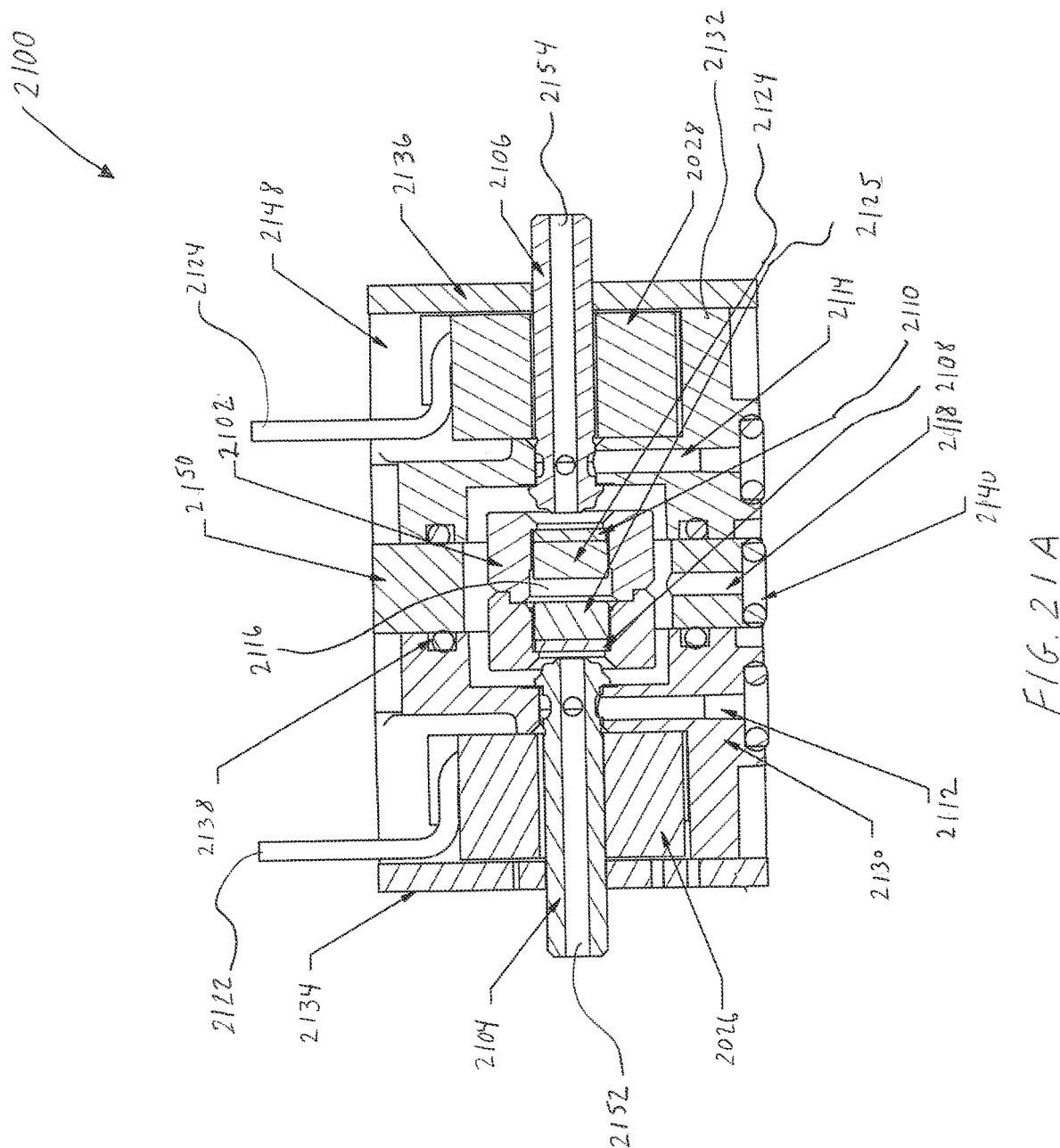
FIGS. 21A-21C are various views of one embodiment of a valve apparatus.
Figure 21B:
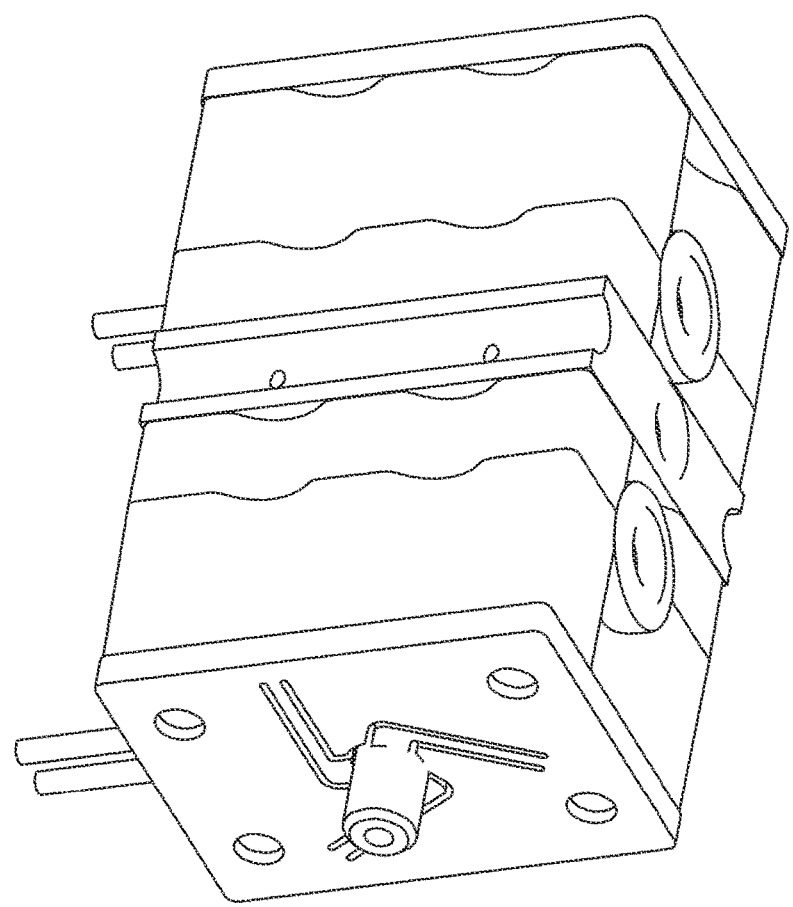
Figure 21C:
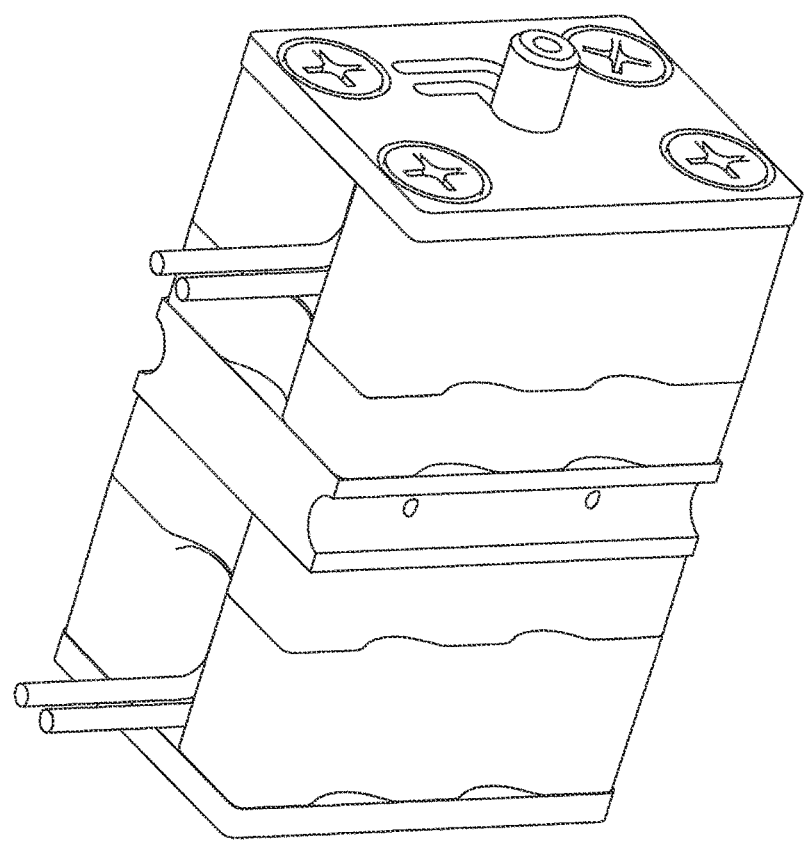

Referring now also to FIGS. 21A-21C, in some embodiments, a bistable valve 2100 may include a shuttle 2102 comprising a two magnet portions 2124, 2125 which are opposing magnet portions 2124, 2125. The shuttle may further include a first membrane portion 2108 attached to the first magnet portion 2125 which will abut a first post 2104, and a second membrane portion 2110 attached to the second magnet portion 2124 which will abut a second post 2106. The shuttle 2102 is disposed in an interior valve cavity 2116. The first post 2104 and the first membrane portion 2108, which is attached to the first magnet portion 2125, may be configured to provide fluid communication from a first pressure inlet 2112 to the interior valve cavity 2116 when the shuttle 2102 is not sealed against the first post 2104. Similarly, the second post 2106 and the second membrane portion 2110, which is attached to the second magnet portion 2124, may be configured to provide fluid communication from a second pressure inlet 2114 to the interior valve cavity 2116 when the shuttle 2102 is not sealed against the second post 2106. In various embodiments the first post 2104 and second post 2106 each include an air port 2152, 2154. In some embodiments of this embodiment, the first post 2104 and the second post 2106 may not include the air ports 2152, 2154. Output orifice 2118 is in constant fluid communication with the interior valve cavity 2116, regardless of which position the shuttle is in. Conversely, the first and second pressure inlets 2112 and 2114 are either in fluid communication with the interior valve cavity 2116, and thus, the output orifice 2118 or they are sealed from fluid communication with the interior valve cavity 2116 by the shuttle 2102. When one of the two pressure inlets 2112, 2114 is in fluid communication with the interior valve cavity 2116, the other pressure inlet is sealed by the shuttle 2102. In various embodiments, the shuttle may be cylindrical and may be made from any material as described above with respect to various embodiments of the shuttle. In various embodiments, the bistable valve 2100 may include contact terminals 2122, 2124 as well as coils 2126, 2128 and end bodies 2130, 2132 and end plates 2134, 2136, attached to the end bodies 2130, 2132. In various embodiments, the bistable valve 2100 may also include at least one gasket seal 2138 and at least one face seal 2140. In various embodiments, the seals may be any type of seal and in various embodiments, there may be more than one seal in the bistable valve 2100. In various embodiments, the bistable valve 2100 may also include locating pins as well as a tie bar/screw (not shown) and an end body housing 2048. In some embodiments, the tie bar/screw attaches the end plates 2134, 2136 to the end body housing 2148, however, in various other embodiments, various methods of attachment may be used including adhesive, bolts, screws, pins, etc.

In various embodiments of the various bistable valves described herein, the coil may be PCB-based flat coils (i.e., coils printed on a circuit board) or wire wound coils.

In various embodiments, stabilizing features may be added to the membrane and/or to the valve seat to assist in sealing the shuttle on the valve seat. Stabilizing features may include, but are not limited to, bumps, nobs, posts, etc. Referring now again to FIG. 17E, in some embodiments, the bistable valve 1700 may include stabilizing features 1740. Although not shown in all figures, stabilizing features may be included in any embodiment.

In various embodiments, any of the magnets shown as part of the shuttle may include embodiments where the magnets are stacked, i.e., more than one magnet forms the magnetic portion of the shuttle. In various embodiments, the size, shape and thickness of the magnet may vary the force, whether opposing or attracting, of the magnet. Therefore, in various embodiments, the size, shape and or thickness of the magnet may vary.

In various embodiments, the where two magnets are shown, they may be replaced by one magnet and where one magnet is shown, it may be replaced by two magnets. The various embodiments include various features. One or more features from one embodiment may be combined with one or more features from one or more other embodiment to form other embodiments.

In various embodiments, the posts may be any shape including those shown as well as other shapes, including, but not limited to pointed.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A bistable valve assembly comprising:
an interior cavity;
a first pressure source connected to the interior cavity;
a second pressure source connected to the interior cavity;
a magnetic shuttle located within the interior cavity;
a first post and a second post, wherein the first post is in fluid communication with the first pressure source and the second post is in fluid communication with the second pressure source; and
a first circuit board comprising at least one electromagnetic coil configured to actuate the magnetic shuttle,
wherein the at least one electromagnetic coil comprises a first electromagnetic coil disposed about the first post wherein, when energized, the first electromagnetic coil supplies magnetic charge to the first post,
wherein when the first electromagnetic coil is energized, the first electromagnetic coil supplies a magnetic charge that energizes the first post to actuate the magnetic shuttle to move towards a first end of the interior cavity and seal the first pressure source,
wherein the first electromagnetic coil is flat against the first circuit board, and wherein the magnetic shuttle having a first and second magnet, each magnet having a first magnetic pole and a second magnetic pole, the first magnetic poles facing each other and the second magnetic poles facing the first and second posts.

2. The valve assembly of claim 1, wherein the first circuit board comprising at least one electromagnetic coil comprises a second electromagnetic coil disposed about the second post wherein, when energized, the second electromagnetic coil supplies magnetic charge to the second post.

3. The valve assembly of claim 2, wherein the first post and the second post further comprising at least one stabilizing feature.

4. The valve assembly of claim 1, further comprising a first and second pressure inlet, the first and second pressure inlet fluidly connected to the first and second pressure source.

5. The valve assembly of claim 1, wherein the interior valve cavity is located between the first and the second post.

6. The valve assembly of claim 1, wherein the magnetic shuttle is sealed against the first pressure source in a first configuration and wherein the magnetic shuttle is sealed against the second pressure source in a second configuration.

\* \* \* \* \*